United States Patent
Yang et al.

(10) Patent No.: US 9,893,801 B2
(45) Date of Patent: *Feb. 13, 2018

(54) METHOD AND DEVICE FOR TRANSMITTING ACK/NACK IN TDD-BASED WIRELESS COMMUNICATION SYSTEM

(71) Applicant: LG ELECTRONICS INC., Seoul (KR)

(72) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

This patent is subject to a terminal disclaimer.

(21) Appl. No.: 15/087,582

(22) Filed: Mar. 31, 2016

(65) Prior Publication Data

US 2016/0218798 A1    Jul. 28, 2016

Related U.S. Application Data

(63) Continuation of application No. 13/882,961, filed as application No. PCT/KR2011/009326 on Dec. 2, 2011, now Pat. No. 9,325,411.

(Continued)

(51) Int. Cl.
*H04L 1/18* (2006.01)
*H04L 1/16* (2006.01)
(Continued)

(52) U.S. Cl.
CPC ......... *H04B 7/2643* (2013.01); *H04L 1/1607* (2013.01); *H04L 1/1621* (2013.01);
(Continued)

(58) Field of Classification Search
CPC ..... H04L 5/0055; H04L 5/001; H04L 5/0016; H04L 5/0007; H04L 5/14; H04L 5/0078;
(Continued)

(56) References Cited

U.S. PATENT DOCUMENTS 8,488,549 B2 *   7/2013   Yang ................. H04L 1/18
                                              370/329
8,614,976 B1    12/2013   Everson et al.
(Continued)

FOREIGN PATENT DOCUMENTS

CN         101399645 A    4/2009
CN         101414900 A    4/2009
(Continued)

OTHER PUBLICATIONS

LG Electronics, "ACK/NACK on PUCCH for TDD", 3GPP TSG RAN WG1 Meeting #63, R1-106099, Nov. 15-19, 2010, pp. 1-14.

(Continued)

*Primary Examiner* — Ayaz Sheikh
*Assistant Examiner* — Debebe Asefa
(74) *Attorney, Agent, or Firm* — Birch, Stewart, Kolasch & Birch, LLP

(57) ABSTRACT

A method is provided for transmitting an acknowledgement/negative-acknowledgement (ACK/NACK) in a wireless communication system based on Time Division Duplex (TDD) in which M downlink subframe(s) are associated with an uplink subframe, where M is equal to or greater than one (1). A user equipment, configured with a plurality of serving cells, receives at least one downlink transport block in the M downlink subframe(s), and determines an ACK/NACK response for the at least one downlink transport block by using one of a plurality of pre-defined mapping rules. Each of the plurality of pre-defined mapping rules is set to define a mapping relation between M ACK/NACK state(s) for each of the plurality of serving cells and the ACK/NACK response based on M. The user equipment transmits the ACK/NACK response.

12 Claims, 19 Drawing Sheets

Related U.S. Application Data

(60) Provisional application No. 61/418,867, filed on Dec. 2, 2010, provisional application No. 61/422,654, filed on Dec. 13, 2010, provisional application No. 61/427,204, filed on Dec. 27, 2010, provisional application No. 61/437,011, filed on Jan. 28, 2011, provisional application No. 61/441,244, filed on Feb. 9, 2011, provisional application No. 61/448,208, filed on Mar. 2, 2011, provisional application No. 61/486,820, filed on May 17, 2011.

(51) Int. Cl.
| | |
|---|---|
| *H04L 5/00* | (2006.01) |
| *H04L 5/14* | (2006.01) |
| *H04W 72/04* | (2009.01) |
| *H04W 72/14* | (2009.01) |
| *H04B 7/26* | (2006.01) |
| *H04L 27/26* | (2006.01) |

(52) U.S. Cl.
CPC .......... *H04L 1/1664* (2013.01); *H04L 1/1685* (2013.01); *H04L 1/1812* (2013.01); *H04L 1/1854* (2013.01); *H04L 5/001* (2013.01); *H04L 5/0055* (2013.01); *H04L 5/0094* (2013.01); *H04L 5/1469* (2013.01); *H04W 72/042* (2013.01); *H04W 72/14* (2013.01); *H04L 5/0016* (2013.01); *H04L 27/2627* (2013.01)

(58) Field of Classification Search
CPC . H04L 27/2627; H04L 1/1664; H04L 1/1685; H04L 1/1854; H04W 72/14; H04B 7/2643

See application file for complete search history.

(56) References Cited

U.S. PATENT DOCUMENTS

| | | | |
|---|---|---|---|
| 8,614,978 | B2 | 12/2013 | Che et al. |
| 8,743,783 | B2 | 6/2014 | Han et al. |
| 8,842,609 | B2 * | 9/2014 | Lee ............ H04L 1/0015 370/280 |
| 2005/0169232 | A1 | 8/2005 | Sakoda et al. |
| 2010/0290439 | A1 | 11/2010 | Dai et al. |
| 2012/0002613 | A1 | 1/2012 | Kishiyama et al. |
| 2014/0016522 | A1 | 1/2014 | Ahn et al. |

FOREIGN PATENT DOCUMENTS

| | | |
|---|---|---|
| CN | 101674157 A | 3/2010 |
| CN | 101695196 A | 4/2010 |
| CN | 101754252 A | 6/2010 |
| CN | 101822117 A | 9/2010 |
| KR | 10-0905385 B1 | 6/2009 |
| WO | WO 2010/049584 A1 | 5/2010 |

OTHER PUBLICATIONS

LG Electronics, "DAI in UL grant for LTE-A TDD", 3GPP TSG RAN WG1 Meeting #63, R1-106128, Nov. 15-19, 2010, pp. 1-3.
Samsung, "HARQ-ACK Coding for DL CA with TDD", 3GPP TSG RAN WG1 Meeting #63, R1-106014, Nov. 15-19, 2010, pp. 1-3.
Samsung, "HARQ-ACK Resource Indication in PUCCH for DL CA", 3GPP TSG RAN WG1 Meeting #62bis, R1-105359, Oct. 11-15, 2010, pp. 1-4.
Chinese Office Action, issued in CN 201180057932.4, dated Mar. 20, 2015.
Catt, "DAI Design for LTE-A," 3GPP TSG RAN WG1 Meeting#62, R1-104311, Madrid, Spain, Aug. 23-27, 2010, 4 pages.
Samsung, "UL DAI for CA," 3GPP TSG RAN WG1 #63, R1-106027, Jacksonville, USA, Nov. 15-19, 2010 (Server Date: Nov. 9, 2010; Downloaded by EPO on Nov. 17, 2010), pp. 1-3.

* cited by examiner

METHOD AND DEVICE FOR TRANSMITTING ACK/NACK IN TDD-BASED WIRELESS COMMUNICATION SYSTEM

CROSS-REFERENCE TO RELATED APPLICATIONS

This application is a Continuation of co-pending U.S. patent application Ser. No. 13/882,961 filed on May 1, 2013, which is filed as the National Phase of PCT/KR2011/009326 filed on Dec. 2, 2011, which claims the benefit under 35 U.S.C. § 119(e) to U.S. Provisional Application Nos. 61/486,820 filed on May 17, 2011, 61/448,208 filed on Mar. 2, 2011, 61/441,244 filed on Feb. 9, 2011, 61/437,011 filed on Jan. 28, 2011, 61/427,204 filed on Dec. 27, 2010, 61/422,654 filed on Dec. 13, 2010 and 61/418,867 filed on Dec. 2, 2010, all of which are hereby expressly incorporated by reference into the present application.

BACKGROUND OF THE INVENTION

The present invention relates to wireless communications, and more particularly, to a method and apparatus for transmitting a reception acknowledgement for hybrid automatic repeat request (HARQ) in a wireless communication system based on time division duplex (TDD).

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009 May) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transport block is received in a plurality of downlink subframes, the user equipment transmits HARQ ACK/NACK for the transport block in the uplink subframe associated with the plurality of downlink subframes.

With the introduction of a plurality of serving cells in the TDD system, a payload of the HARQ ACK/NACK is increased in size. It is important to increase transmission reliability of the HARQ ACK/NACK to guarantee reliability when performing HARQ. However, if the payload of the HARQ ACK/NACK is excessively great, it is difficult to increase a data rate for user traffic.

Accordingly, there is a need for a method capable of decreasing the increased payload of the HARQ ACK/NACK while maintaining transmission reliability of the HARQ ACK/NACK.

SUMMARY OF THE INVENTION

The present invention provides a method and apparatus for transmitting positive-acknowledgement (ACK)/negative-acknowledgement (NACK) in a wireless communication system based on time division duplex (TDD).

In an aspect, a method of transmitting a ACK/NACK in a wireless communication system based on Time Division Duplex in which M (M≥1) downlink subframe is associated with an uplink subframe is provided. The method includes receiving, by a user equipment, at least one downlink transport block in the M downlink subframe for each of a plurality of serving cells from a base station, receiving, by the user equipment, an uplink grant from the base station, the uplink grant including an uplink resource assignment and piggyback information, the piggyback information including an index which is equal to or less than M, determining, by the user equipment, a ACK/NACK response for the at least one downlink transport block in accordance with the piggyback information, multiplexing, by the user equipment, the ACK/NACK response with an uplink transport block, and transmitting, by the user equipment, the multiplexed ACK/NACK response by using the uplink resource assignment in the uplink subframe to the base station.

The index may indicate a maximum among a number of downlink subframes with at least one downlink transport block for each serving cell.

The method may further include if no uplink grant is received, determining a ACK/NACK response for the at least one downlink transport block in accordance with M, and transmitting, by the user equipment, the ACK/NACK response in the uplink subframe to the base station.

Each downlink transport block may be received on each physical downlink shared channel (PDSCH) and a PDSCH may be indicated by a downlink resource assignment in a downlink grant on a corresponding physical downlink control channel (PDCCH). The downlink grant may include a downlink assignment index (DAI) which indicates a accumulative number of PDCCH with assigned PDSCH transmission.

In another aspect, a wireless device configured for transmitting a ACK/NACK in a wireless communication system based on Time Division Duplex in which M (M≥1) downlink subframe is associated with an uplink subframe is provided. The wireless device includes a radio frequency unit configured to transmit radio signals and a processor operatively coupled with the radio frequency unit and configured to receive at least one downlink transport block in the M downlink subframe for each of a plurality of serving cells from a base station, receive an uplink grant from the base station, the uplink grant including an uplink resource assignment and piggyback information, the piggyback information including an index which is equal to or less than M, determine a ACK/NACK response for the at least one downlink transport block in accordance with the piggyback information, multiplex the ACK/NACK response with an uplink transport block, and transmit the multiplexed ACK/NACK response by using the uplink resource assignment in the uplink subframe to the base station.

A method of transmitting a reception acknowledgement in a time division duplex (TDD) system having a plurality of serving cells is proposed. ACK/NACK mismatch between a base station and a user equipment may be mitigated, and an ACK/NACK payload can be decreased in size.

DETAILED DESCRIPTION OF THE INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
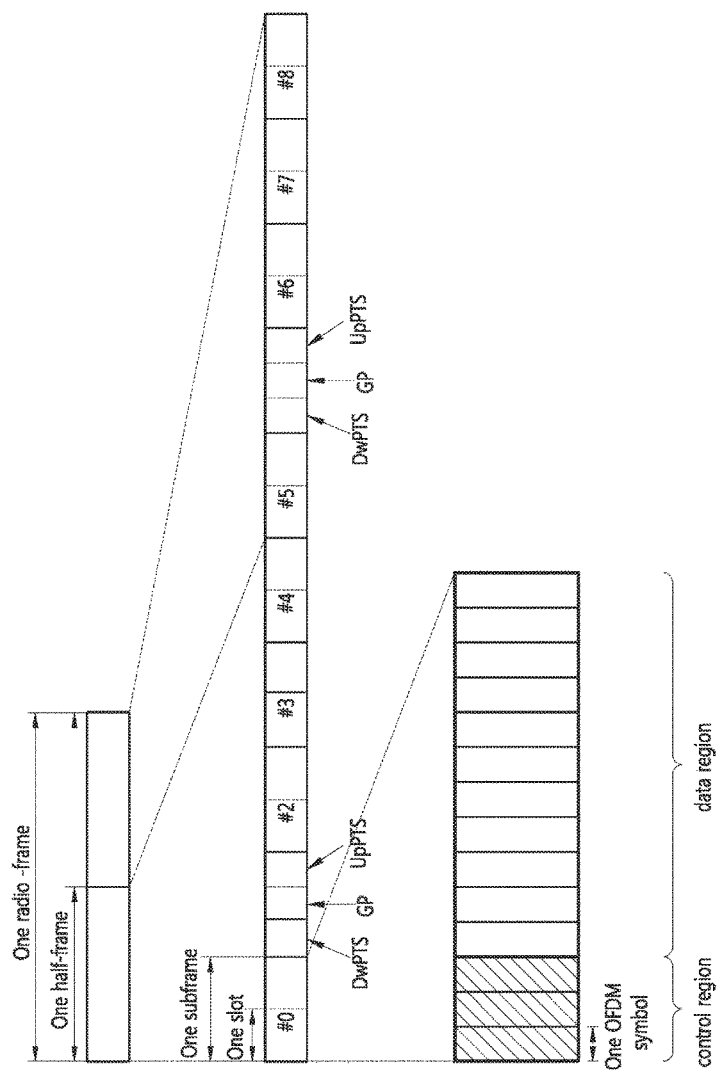
FIG. 1 shows a downlink radio frame structure in 3$^{rd}$ generation partnership project (3GPP) long term evolution (LTE).

FIG. 1 shows a downlink radio frame structure in 3$^{rd}$ generation partnership project (3GPP) long term evolution (LTE). The section 6 of 3GPP TS 36.211 V8.7.0 (2009 May) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing cyclic redundancy check (CRC) error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
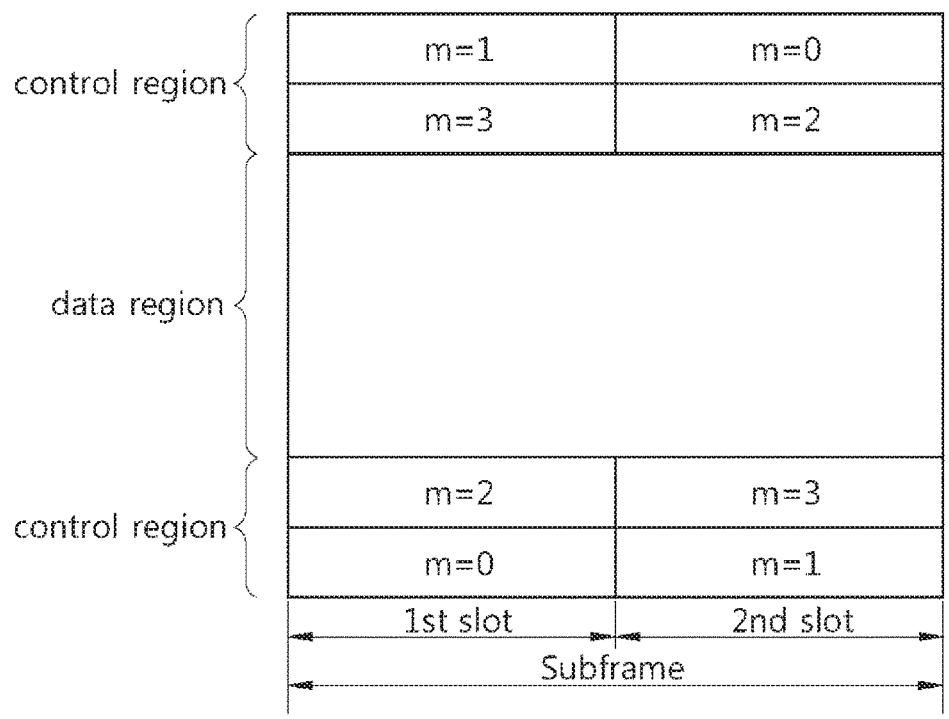
FIG. 2 shows an example of an uplink subframe in 3GPP LTE.
Figure 2:
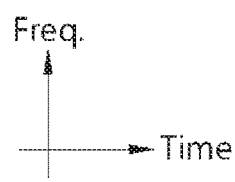

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 2 below shows an example of a modulation scheme and the number of bits per subframe according to the PUCCH format.

TABLE 2

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u$ (n) is defined by Equation 1 below.

$$r_u = e^{jb(n)\pi/4} \quad \text{[Equation 1]}$$

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{cs})$.

$$r(n, I_{cs}) = r(n) \cdot \exp\left(\frac{j2\pi I_{cs} n}{N}\right), \quad \text{[Equation 2]}$$

$$0 \leq I_{cs} \leq N - 1$$

In Equation 2, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in the PUCCH format 1b will be described.

Figure 3:
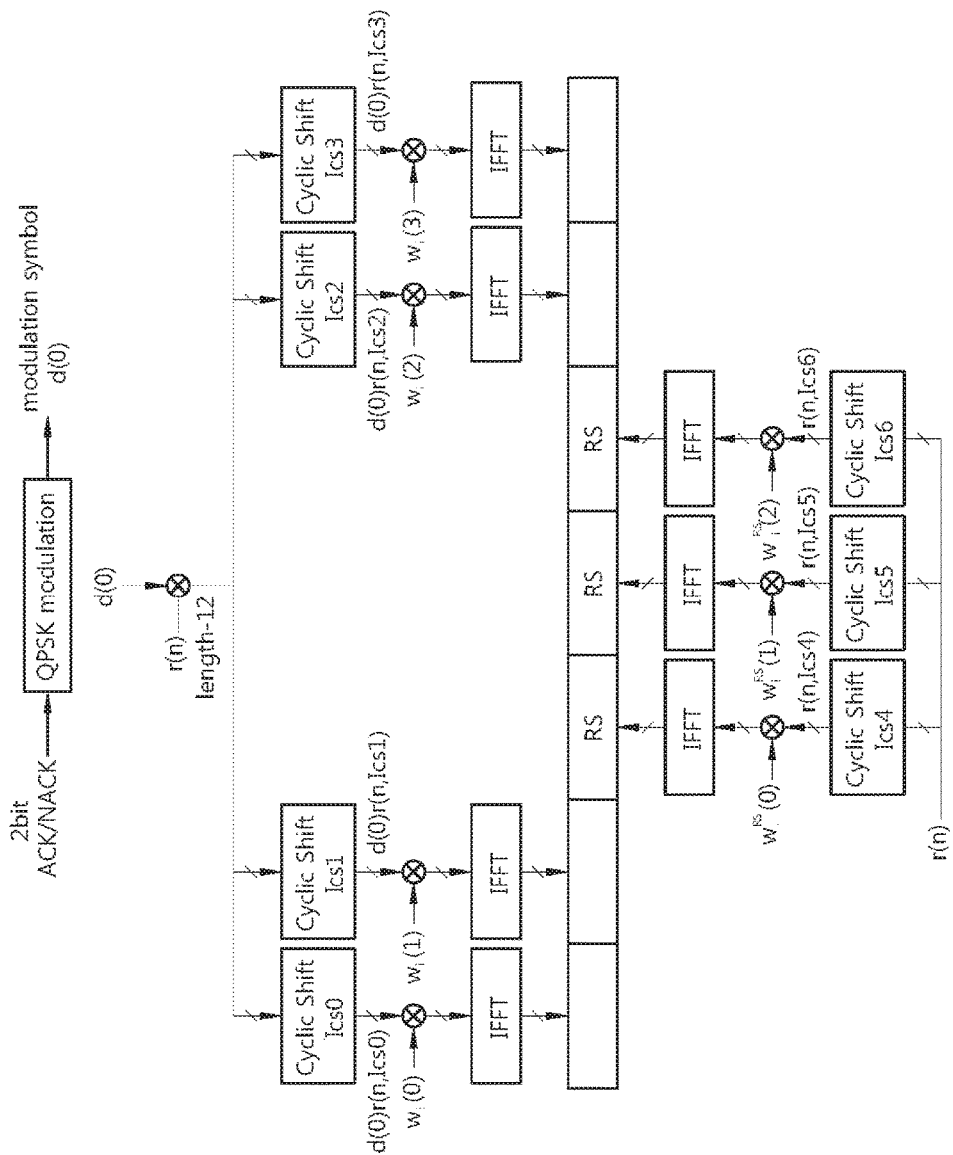
FIG. 3 shows a physical uplink control channel (PUCCH) format 1b in a normal cyclic prefix (CP) in 3GPP LTE.

FIG. 3 shows a PUCCH format 1b in a normal CP in 3GPP LTE.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index l in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n, I_{cs})$. When a one-dimensionally spread sequence mapped to an $(i+1)^{th}$ OFDM symbol in a subframe is denoted by m(i), it can be expressed as follows.

$$\{m(0), m(1), m(2), m(3)\} = \{d(0)r(n, I_{cs0}), d(0)r(n, I_{cs1}), d(0)r(n, I_{cs2}), d(0)r(n, I_{cs3})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spread factor K=4 uses the following sequence.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, a two-dimensionally spread sequences {s(0), s(1), s(2), s(3)} can be expressed as follows.

$$\{s(0), s(1), s(2), s(3)\} = \{w_i(0)m(0), w_i(1)m(1), w_i(2)m(2), w_i(3)m(3)\}$$

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence.

When CS indices mapped to three RS OFDM symbols are denoted by $I_{cs4}$, $I_{cs5}$, and $I_{cs6}$, three cyclically shifted sequences $r(n, I_{cs4})$, $r(n, I_{cs5})$, and $r(n, I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed with one resource block.

In the 3GPP LTE, a resource index $n^{(1)}_{PUUCH}$ is defined in order for the UE to obtain the three parameters for configuring the PUCCH. The resource index $n^{(1)}_{PUUCH}$ is defined to $n_{CCE} + N^{(1)}_{PUUCH}$, where $n_{CCE}$ is an index of a first CCE used for transmission of corresponding DCI (i.e., DL resource allocation used to receive DL data mapped to an ACK/NACK signal), and $N^{(1)}_{PUUCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Figure 4:
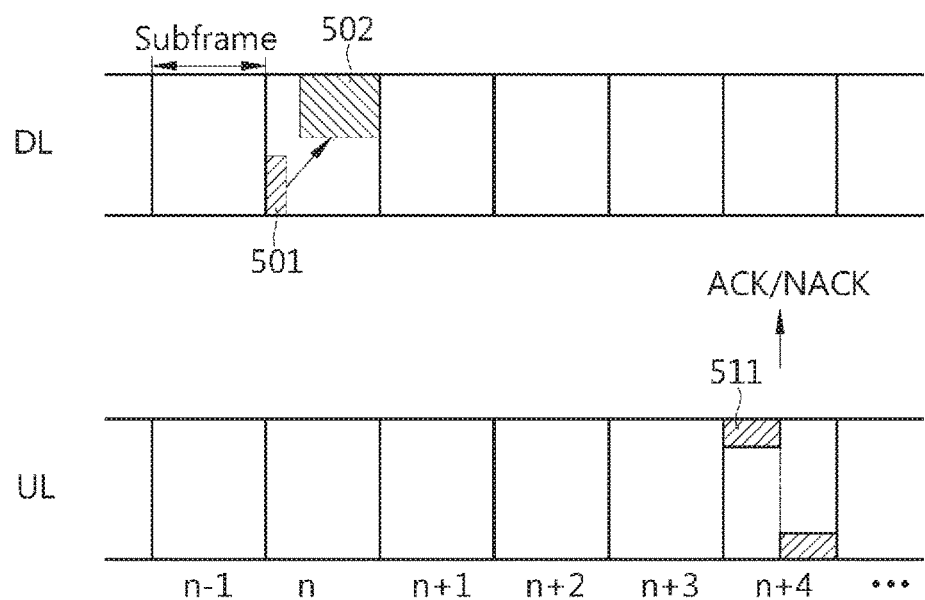
FIG. 4 shows an example of performing hybrid automatic repeat request (HARQ).

FIG. 4 shows an example of performing HARQ.

By monitoring a PDCCH, a UE receives a DL grant including a DL resource allocation on a PDCCH 501 in an $n^{th}$ DL subframe. The UE receives a DL transport block through a PDSCH 502 indicated by the DL resource allocation.

The UE transmits an ACK/NACK response for the DL transport block on a PUCCH 511 in an $(n+4)^{th}$ UL subframe. The ACK/NACK response can be regarded as a reception acknowledgement for a DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUUCH} = n_{CCE} + N^{(1)}_{PUUCH}$.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC may be mapped to one cell. Therefore, when a UE communicates with a BS through a plurality of DL CCs, it can be said that the UE receives a service from a plurality of serving cells.

Figure 5:
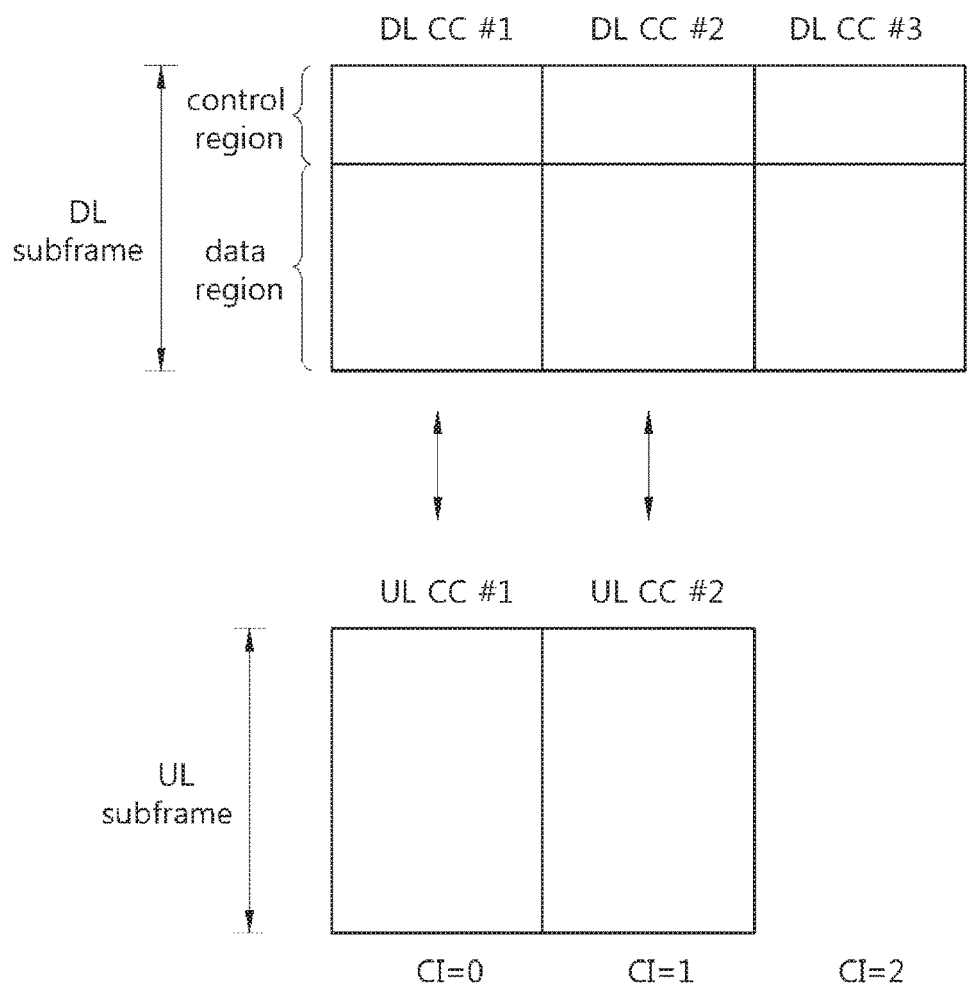
FIG. 5 shows an example of multiple carriers.

FIG. 5 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CC. The UE can transmit a plurality of UL transport blocks simultaneously via a plurality of UL CCs.

It is assumed that a pair of a DL CC #1 and a UL CC #1 is a 1$^{st}$ serving cell, a pair of a DL CC #2 and a UL CC #2 is a 2$^{nd}$ serving cell, and a DL CC #3 is a 3$^{rd}$ serving cell. Each serving cell can be identified by using a cell index (CI). The CI may be cell-specific or UE-specific. Herein, CI=0, 1, 2 are assigned to the 1$^{st}$ to 3$^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Now, ACK/NACK transmission for HARQ in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

According to the section 10.1 of 3GPP TS 36.213 V8.7.0 (2009 May), two ACK/NACK modes, i.e., channel selection and bundling, are introduced.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a count indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n-k associated with a UL subframe n depending on the UL-DL configuration in 3GPP LTE. Herein, k∈K, where M is the number of elements of a set K.

TABLE 5

| UL-DL configuration | Subframe n | | | | | | | | |
|---|---|---|---|---|---|---|---|---|---|
|  | 0 | 1 | 2 | 3 | 4 | 5 | 6 | 7 | 8 |
| 0 | — | — | 6 | — | 4 | — | — | 6 | — |
| 1 | — | — | 7, 6 | 4 | — | — | — | 7, 6 | 4 |
| 2 | — | — | 8, 7, 4, 6 | — | — | — | — | 8, 7, 4, 6 | — |
| 3 | — | — | 7, 6, 11 | 6, 5 | 5, 4 | — | — | — | — |
| 4 | — | — | 12, 8, 7, 11 | 6, 5, 4, 7 | — | — | — | — | — |
| 5 | — | — | 13, 12, 9, 8, 7, 5, 4, 11, 6 | — | — | — | — | — | — |
| 6 | — | — | 7 | 7 | 5 | — | — | 7 | 7 |

Assume that M DL subframes are associated with a UL subframe n, where M=3. Since 3 PDCCHs can be received from 3 DL subframes, the UE can acquire 3 PUCCH resources $n^{(1)}_{PUCCH,0}$, $n^{(1)}_{PUCCH,1}$, and $n^{(1)}_{PUCCH,2}$. An example of channel selection is shown in Table 6 below.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an i$^{th}$ DL subframe among the M DL subframes. Discontinuous transmission (DTX) implies that a DL transport block cannot be received on a PDSCH in a corresponding DL subframe or a corresponding PDCCH cannot be detected. According to Table 3 above, there are three PUCCH resources $n^{(1)}_{PUCCH,0}$, $n^{(1)}_{PUCCH,1}$, and $n^{(1)}_{PUCCH,2}$, and b(0) and b(1) are two bits transmitted by using a selected PUCCH.

For example, if the UE successfully receives three DL transport blocks in three DL subframes, the UE perform QPSK modulation on bits (1,1) by using $n^{(1)}_{PUCCH,2}$ and transmits the modulated bits through the PUCCH. If the UE fails to decode the DL transport block and succeeds in the decoding of the remaining transport blocks in a 1$^{st}$ (i=0) DL subframe, the UE transmits bits (1,0) through the PUCCH by using $n^{(1)}_{PUCCH,2}$.

In channel selection, NACK and DTX are coupled if there is at least one ACK. This is because all ACK/NACK states cannot be expressed by combining a reserved PUCCH resource and a QPSK symbol. However, if the ACK does not exist, the DTX is decoupled from the NACK.

The conventional PUCCH format 1b can transmit only 2-bit ACK/NACK. However, channel selection is used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of a DL subframe (or PDCCH).

Assume that M=3, and the BS transmits 3 DL transport blocks through 3 DL subframes. The UE misses the PDCCH in the $2^{nd}$ DL subframe and thus cannot receive a $2^{nd}$ transport block at all, and can receive only the remaining $1^{st}$ and $3^{1d}$ transport blocks. In this case, if bundling is used, the UE erroneously transmits ACK.

In order to solve this error, a downlink assignment index (DAI) is included in a DL grant on the PDCCH. The DAI indicates an accumulative number of the PDCCH having assigned PUSCH transmission. A value of the 2-bit DAI is sequentially increased from 1, and a modulo-4 operation is applicable again from DAI=4. If M=5 and all of 5 DL subframes are scheduled, the DAI can be included in a corresponding PDCCH in the order of DAI=1, 2, 3, 4, 1.

Figure 6:
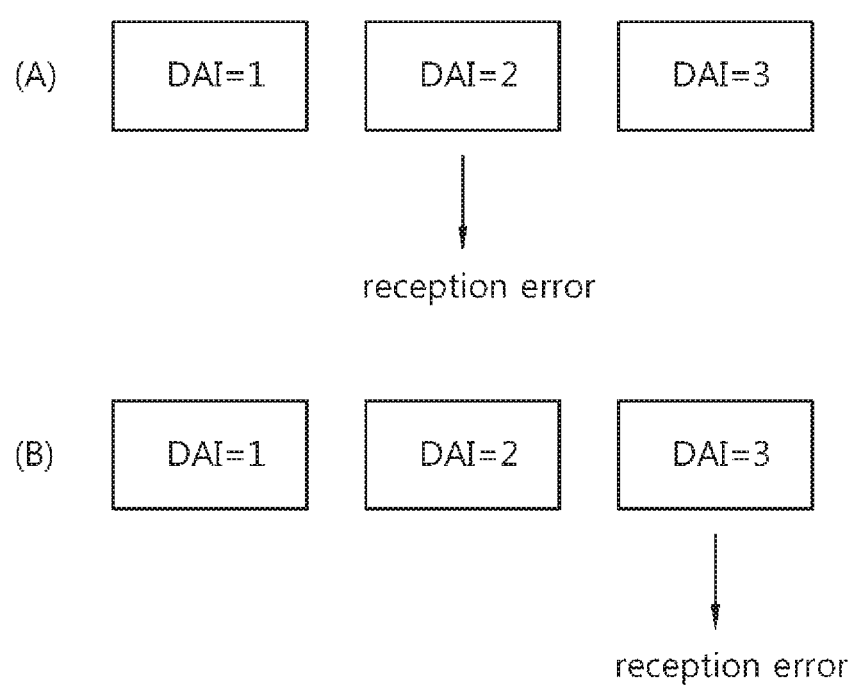
FIG. 6 shows examples of error detection using a downlink assignment index (DAI).

FIG. 6 shows examples of error detection using a DAI.

In FIG. 6A, a UE misses a $2^{nd}$ DL subframe, and thus cannot receive DAI=2. In this case, the UE receives DAI=3, and thus can know missing of a DL subframe corresponding to DAI=2.

In FIG. 6B, the UE misses a $3^{rd}$ DL subframe, and thus cannot receive DAI=3. In this case, the UE cannot know missing of the $3^{rd}$ DL subframe. However, in 3GPP LTE, a PUCCH is configured on the basis of a $1^{st}$ CCE of a last received PDCCH so that a BS can know missing of the DL subframe. That is, the UE transmits ACK/NACK by using a PUCCH resource based on a PUCCH resource of a DL subframe corresponding to DAI=2. The BS can know the missing of the $3^{rd}$ DL subframe since the ACK/NACK is received by using the PUCCH resource corresponding to the DL subframe with DAI=2 rather than the DL subframe with DAI=3.

Meanwhile, as a plurality of serving cells are used, an additional PUCCH format 3 is under discussion in addition to the PUCCH format of the conventional 3GPP LTE, in preparation for a case in which the number of ACK/NACK bits is insufficient.

Figure 7:
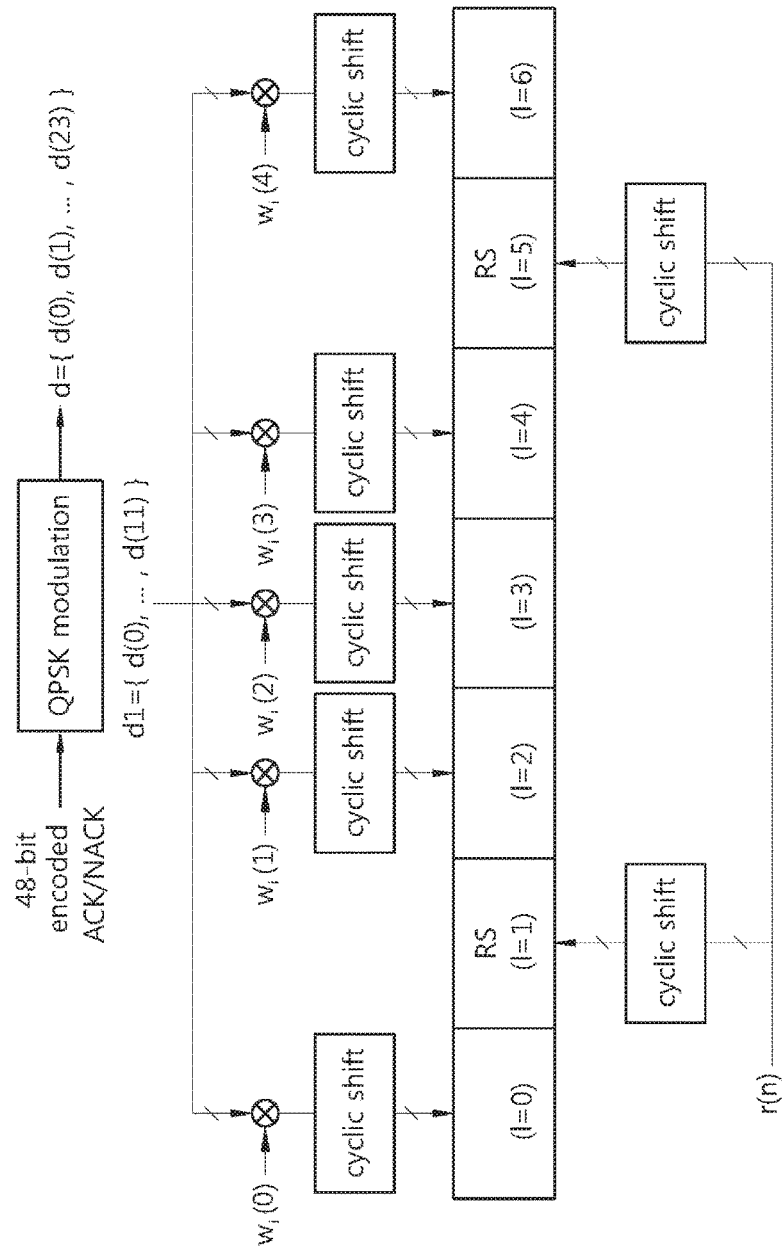
FIG. 7 shows an example of a structure of a PUCCH format 3 in a normal CP.

FIG. 7 shows an example of a structure of a PUCCH format 3 in a normal CP.

One slot includes 7 OFDM symbols. 1 denotes an OFDM symbol number in the slot, and has a value in the range of 0 to 6. Two OFDM symbols with 1=1, 5 are used as RS OFDM symbols for a reference signal, and the remaining OFDM symbols are used as data OFDM symbols for an ACK/NACK signal.

A symbol sequence d={d(0), d(1), . . . , d(23)} is generated by performing QPSK modulation on a 48-bit encoded ACK/NACK signal. d(n)(n=0, 1, . . . , 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. FIG. 5 shows that the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of Table 5 below can be selected in accordance with an orthogonal sequence index i.

TABLE 7

| Index (i) | [$w_i(0)$, $w_i(1)$, $w_i(2)$, $w_i(3)$, $w_i(4)$] |
|---|---|
| 0 | [+1, +1, +1, +1, +1] |
| 1 | [+1, $e^{j2\pi/5}$, $e^{j4\pi/5}$, $e^{j6\pi/5}$, $e^{j8\pi/5}$] |
| 2 | [+1, $e^{j4\pi/5}$, $e^{j8\pi/5}$, $e^{j2\pi/5}$, $e^{j6\pi/5}$] |
| 3 | [+1, $e^{j6\pi/5}$, $e^{j2\pi/5}$, $e^{j8\pi/5}$, $e^{j4\pi/5}$] |
| 4 | [+1, $e^{j8\pi/5}$, $e^{j6\pi/5}$, $e^{j4\pi/5}$, $e^{j2\pi/5}$] |

Two slots in the subframe can use different orthogonal sequence indices.

Each spread symbol sequence is cyclically shifted by a cell-specific CS value $n^{cell}_{cs}(n_s,1)$ Each cyclically shifted symbol sequence is transmitted by being mapped to a corresponding data OFDM symbol.

$n^{cell}_{cs}(n_s,1)$ is a cell-specific parameter determined by a pseudo-random sequence which is initialized on the basis of a physical cell identity (PCI). $n^{cell}_{cs}(n_s,1)$ varies depending on a slot number $n_s$ in a radio frame and an OFDM symbol number 1 in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

Now, semi-persistent scheduling (SPS) will be described.

In general, a UE first receives a DL grant on a PDCCH, and subsequently receives a transport block through a PDSCH indicated by the DL grant. This implies that PDCCH monitoring is accompanied in every transport block, which is called dynamic scheduling.

The SPS pre-defines a PDSCH resource, and the UE receives a transport block through the pre-defined resource without PDCCH monitoring.

Figure 8:
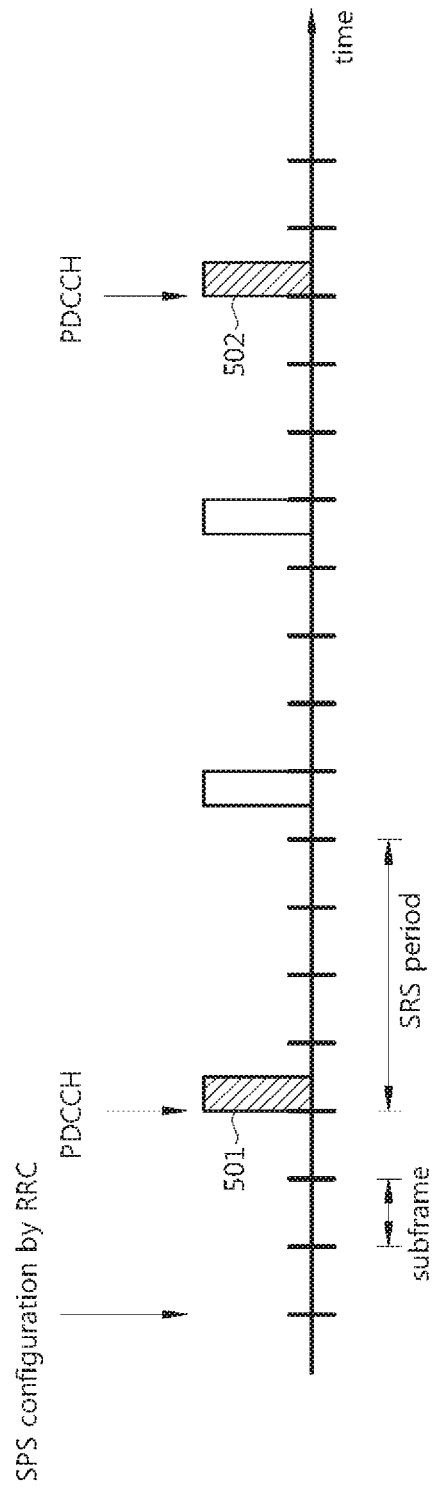
FIG. 8 shows an example of semi-persistent scheduling (SPS) in 3GPP LTE.

FIG. 8 shows an example of SPS in 3GPP LTE. Although DL SPS is shown herein, the same is also applicable to UL SPS.

First, a BS sends an SPS configuration to a UE by using radio resource control (RRC). The SPS configuration includes an SPS-C-RNTI and an SPS period. It is assumed herein that the SPS period is four subframes.

Even if the SPS is configured, the SPS is not immediately performed. The UE monitors a PDCCH 501 in which a CRC is masked with the SPS-C-RNTI, and performs the SPS after the SPS is activated. When NDI=0 is included in DCI on the PDCCH 501, combinations of values of several fields (e.g., a transmit power command (TPC), a cyclic shift (CS) of a demodulation reference signal (DMRS), a modulation and coding scheme (MCS), a redundancy version (RV), an HARQ process number, and a resource allocation) included in the DCI are used in SPS activation and deactivation.

When the SPS is activated, even if a DL grant on the PDCCH is not received, the UE receives a transport block on a PDSCH at an SPS period. The PDSCH received without the PDCCH is called an SPS PDSCH.

Thereafter, the UE monitors a PDCCH 502 in which a CRC is masked with the SPS-C-RNTI, and confirms deactivation of the SPS.

According to 3GPP LTE, the PDCCH indicating the activation of the SPS does not require an ACK/NACK response, but the PDCCH indicating the deactivation of the SPS requires the ACK/NACK response. Hereinafter, a DL transport block may include the PDCCH indicating the deactivation of the SPS.

According to the conventional PUCCH formats 1a/1b, a resource index $n^{(1)}_{PUCCH}$ is derived from the PDCCH. However, according to the SPS, the PDCCH associated with the PDSCH is not received, and thus a pre-assigned resource index is used.

Now, ACK/NACK transmission in a TDD system according to the present invention will be described.

An ACK/NACK state for HARQ indicates one of the following three states.

ACK: a decoding success of a transport block received on a PDSCH.

NACK: a decoding failure of the transport block received on the PDSCH.

DTX: a failure in the reception of the transport block on the PDSCH. In case of dynamic scheduling, a failure in the reception of a PDCCH.

As shown in Table 5, the M DL subframes are associated with the UL subframe according to the UL-DL configuration. In this case, in order to express all of the three states in the UL subframe n, at least 2M bits are required for ACK/NACK transmission.

In order to express the ACK/NACK by using a smaller number of bits, an ACK/NACK multiplexing method may be considered as follows.

(1) Bundled ACK: If the number of received DAIs is equal to the number of ACKs, the ACK/NACK is set to the number of ACKs (or 1), and otherwise, ACK/NACK=0. If an SPS PDSCH is present, an ACK for this is included. For example, it is assumed that the number of DAIs is 2, and one SPS PDSCH is present. If the total number of ACKs is 3, ACK/NACK=3.

(2) ACK counter: ACK/NACK is set to the number of ACKs corresponding to a DAI value which contiguously increases starting from a $1^{st}$ DAI value. For example, if reception of a PDSCH corresponding to a $1^{st}$ DAI fails, ACK/NACK=0. If reception of a PDSCH corresponding to $1^{st}$ to $3^{rd}$ DAIs is successful but reception of a PDSCH corresponding to a $4^{th}$ DAI fails, ACK/NACK=3.

If ACK/NACK is 2 bits, a modulo-3 operation can be applied. If the ACK counter method is used and a TDD configuration with DL:UL=9:1 is considered, ACK/NACK can be expressed as follows.

If the number of ACKs (or NACK or DTX) is 0, ACK/NACK=0

If the number of ACKs is 1 or 4 or 7, ACK/NACK=1

If the number of ACKs is 2 or 5 or 8, ACK/NACK=2

If the number of ACKs us 3 or 6 or 9, ACK/NACK=3

Meanwhile, the SPS PDSCH and the dynamic PDSCH can be simultaneously scheduled in a specific UL subframe. In this case, the BS may drop the SPS PDSCH and schedule the dynamic PDSCH. This is called SPS overriding.

In the SPS overriding, if the UE fails to receive the PDCCH, an ACK/NACK error may occur since the UE expects the SPS PDSCH.

Figure 9:
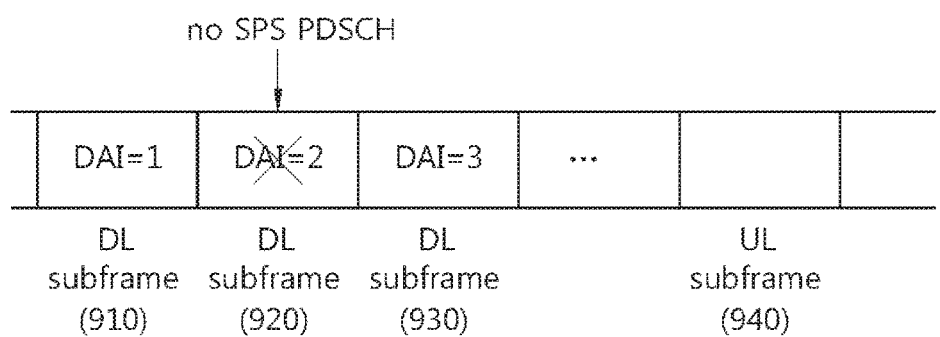
FIG. 9 shows an example of a positive-acknowledgement (ACK)/negative-acknowledgement (NACK) error.

FIG. 9 shows an example of an ACK/NACK error.

It is considered that there are 3 DL subframes 910, 920, and 930 associated with a UL subframe 940. That is, M=3. The value M or the three consecutive DL subframes 910, 920, and 930 are for exemplary purposes only.

It is assumed that, in the $1^{st}$ DL subframe 910, a UE receives a PDCCH with DAI=1, and an ACK/NACK state of a corresponding PDSCH is ACK.

In the $2^{nd}$ DL subframe 920, the SPS overriding occurs, and thus a BS transmits a PDCCH with DAI=2 instead of transmitting the SPS PDSCH. It is assumed that the UE fails to receive the PDCCH with DAI=2. The UE cannot know the SPS overriding since the UE fails to receive a dynamic PDCCH. Therefore, the UE recognizes that reception of the SPS PDSCH fails in the $2^{nd}$ DL subframe 920, and determines the ACK/NACK state as 'NACK'. However, from the perspective of the BS, a correct ACK/NACK state is 'DTX'. Accordingly, ACK/NACK mismatch may occur between the BS and the UE.

The mismatch can be solved by using a last received DAI.

It is assumed that, in the $3^{rd}$ DL subframe 930, the UE receives a PDCCH with DAI=3, and an ACK/NACK state of a corresponding PDSCH is ACK. Since the UE receives DAI=3 after receiving DAI=1, the UE knows missing of DAI=2. Therefore, in the $2^{nd}$ DL subframe 920, the UE recognizes that SPS overriding exists and the ACK/NACK state is 'DTX'. As a result, the ACK/NACK mismatch can be solved.

Accordingly, a case in which the UE can recognize the SPS overriding is as follows: a case in which, when an SPS PDSCH is configured with a DL subframe N (1≤N≤M), the UE detects a dynamic PDCCH in the DL subframe N, or a difference between two DAI values received through a DL subframe N−1 and a DL subframe N+1 is 2, or a DAI value received through a DL subframe L (N+1≤L≤M) is L.

Now, ACK/NACK transmission on a PUCCH using ACK/NACK channel selection will be described according to an embodiment of the present invention.

A method of mapping $2^M$ states, where M=1, 2, 3, 4, in a 2-bit ACK/NACK state is proposed when an ACK/NACK state is expressed up to 4 states with 2 bits. If M>2, an ACK counter is applied. If M≤2, the ACK counter may not be applied.

In the following table, 'A' denotes ACK, 'N' denotes NACK, 'D' denotes DTX', and 'any' denotes any one of ACK, NACK, and DTX.

In the TDD configuration of Table 5 above, if M=2, the ACK/NACK state can be expressed by Table 8 or Table 9 below.

TABLE 8

| HARQ-ACK(1), HARQ-ACK(2) | ACK/NACK state |
|---|---|
| A, A | A, A |
| N, A | N/D, A |
| A, N/D | A, N/D |
| (N, N/D) or (D, any) | N/D, N/D |

In the above table, {HARQ-ACK(1), HARQ-ACK(2)}= (N, N/D) can be mapped to the ACK/NACK state (N, N). Alternatively, {HARQ-ACK(1), HARQ-ACK(2)}=(D, any) can be mapped to the ACK/NACK state (D, D).

TABLE 9

| HARQ-ACK(1), HARQ-ACK(2) | ACK/NACK state |
|---|---|
| A, A | A, A |
| N/D, A | N/D, A |
| A, N/D | A, N/D |
| N/D, N/D | N/D, N/D |

In the above table, {HARQ-ACK(1), HARQ-ACK(2)}= (N, N/D) can be mapped to the ACK/NACK state (N, N). Alternatively, {HARQ-ACK(1), HARQ-ACK(2)}=(D, N/D) can be mapped to the ACK/NACK state (D, D).

If M=3, the ACK/NACK state can be expressed by Table 10 below.

TABLE 10

| HARQ-ACK(1), HARQ-ACK(2), HARQ-ACK(3) | ACK/NACK state |
|---|---|
| A, A, A | A, A |
| A, A, N/D | N/D, A |
| A, N/D, any | A, N/D |
| N/D, any, any | N/D, N/D |

In the above table, {HARQ-ACK(1), HARQ-ACK(2), HARQ-ACK(3)}=(N, any, any) can be mapped to the ACK/NACK state (N, N). Alternatively, {HARQ-ACK(1), HARQ-ACK(2), HARQ-ACK(3)}=(D, any, any) can be mapped to the ACK/NACK state (D, D).

If M=4, the ACK/NACK state can be expressed by Table 11 below.

TABLE 11

| HARQ-ACK(1), HARQ-ACK(2), HARQ-ACK(3), HARQ-ACK(4) | ACK/NACK state |
|---|---|
| A, A, A, N/D | A, A |
| A, A, N/D, any | N/D, A |
| (A, D, D, D) or (A, A, A, A) | A, N/D |
| (N/D, any, any, any) or (A, N/D, any, any), except for (A, D, D, D) | N/D, N/D |

In the above table, {HARQ-ACK(1), HARQ-ACK(2), HARQ-ACK(3), HARQ-ACK(4)}='(N, any, any, any) or (A, N/D, any, any), except for (A, D, D, D)' can be mapped to the ACK/NACK state (N, N). Alternatively, {HARQ-ACK(1), HARQ-ACK(2), HARQ-ACK(3), HARQ-ACK(4)}=(D, any, any, any) can be mapped to the ACK/NACK state (D, D).

Herein, HARQ-ACK(m) (1≤m≤M) can be defined as follows, with respect to a corresponding serving cell.

(1) When ACK/NACK is transmitted on a PUCCH in the absence of SPS.

If M=1, spatial bundling is not applied, and an individual ACK/NACK state for each codeword is transmitted as an ACK/NACK response.

If M=2, spatial bundling is applied, HARQ-ACK(1) corresponds to a 1$^{st}$ associated DL subframe, and HARQ-ACK(2) corresponds to a 2$^{nd}$ associated DL subframe.

If M=3 or 4, spatial bundling is applied, and HARQ-ACK (j), 1≤j≤M, corresponds to PDSCH transmission in which a DAI included in a PDCCH has a value j.

(2) When ACK/NACK is transmitted on a PUCCH in the presence of SPS.

If M=1, spatial bundling is not applied, and an individual ACK/NACK state for each codeword is transmitted as an ACK/NACK response.

If M=2, spatial bundling is applied, HARQ-ACK(1) corresponds to a 1$^{st}$ associated DL subframe, and HARQ-ACK(2) corresponds to a 2$^{nd}$ associated DL subframe.

If M=3 or 4, spatial bundling is applied, HARQ-ACK(1) is ACK/NACK for a PDSCH without a PDCCH, and HARQ-ACK(j), 2≤j≤M, corresponds to PDSCH transmission in which a DAI included in the PDCCH has a value j−1.

Spatial bundling implies ACK/NACK bundling for codewords in respective DL subframes for each serving cell. For example, if a DL transport block in a DL subframe includes two codewords, bundled ACK/NACK is derived by performing a binary AND operation on ACK/NACK bits with respect to the two codewords.

A 2-bit ACK/NACK state for applying channel selection of Table 6 can be derived on the basis of Table 8 to Table 11 above.

When two serving cells are present, channel selection can be performed as shown in the following table, with respect to the 2-bit ACK/NACK state derived from each serving cell.

TABLE 12

| ACK/NACK state for 1$^{st}$ serving cell | | ACK/NACK state for 2$^{nd}$ serving cell | | Resource | Constellation |
|---|---|---|---|---|---|
| D | N/D | N/D | N/D | | No Tx |
| N | N/D | N/D | N/D | H0 | +1 |
| A | N/D | N/D | N/D | H0 | −1 |
| N/D | A | N/D | N/D | H1 | −j |
| A | A | N/D | N/D | H1 | +j |
| N/D | N/D | A | N/D | H2 | +1 |
| A | N/D | A | N/D | H2 | +j |
| N/D | A | A | N/D | H2 | −j |
| A | A | A | N/D | H2 | −1 |
| N/D | N/D | N/D | A | H3 | +1 |
| A | N/D | N/D | A | H0 | −j |
| N/D | A | N/D | A | H3 | +j |
| A | A | N/D | A | H0 | +j |
| N/D | N/D | A | A | H3 | −j |
| A | N/D | A | A | H3 | −1 |
| N/D | A | A | A | H1 | +1 |
| A | A | A | A | H1 | −1 |

Herein, 'No Tx' denotes no transmission to the PUCCH, and H0, H1, H2, and H3 denote a resource index $n^{(1)}_{PUCCH}$ for the PUCCH.

If the 1$^{st}$ serving cell is a primary cell and the 2$^{nd}$ serving cell is a secondary cell, the followings are defined.

H0 and H1 for the primary cell can be defined as follows.

In the presence of SPS, H0 is a resource index given in advance through higher layer signaling for the SPS, and H1 is a resource index derived from a PDCCH in which a DAI value is 1.

In the absence of the SPS, H0 and H1 are resource indices derived from PDCCHs in which DAI values are 1 and 2, respectively.

H2 and H3 for the secondary cell can be defined as follows.

If a PDSCH of the secondary cell is indicated through the PDCCH of the primary cell, H2 and H3 are resource indices derived from PDCCHs in which DAI values are 1 and 2, respectively.

If a PDSCH of the secondary cell is indicated through the PDCCH of the secondary cell, H2 and H3 are resource indices determined according to a higher layer configuration.

Assume that QPSK modulation is given as follows.

TABLE 13

| b(0)b(1) | Constellation |
|---|---|
| 00 | 1 |
| 01 | −j |
| 10 | j |
| 11 | −1 |

If M=3, the ACK/NACK state of Table 10 can be applied to Table 12, which is summarized as follows.

TABLE 14

| HARQ-ACK(1), HARQ-ACK(2), and HARQ-ACK(3) for 1st serving cell | HARQ-ACK(1), HARQ-ACK(2), and HARQ-ACK(3) for 2nd serving cell | Resource | Constellation b(0)b(1) |
|---|---|---|---|
| A, A, A | A, A, A | H1 | 11 |
| A, A, N/D | A, A, A | H1 | 00 |
| A, N/D, any | A, A, A | H3 | 11 |
| N/D, any, any | A, A, A | H3 | 01 |
| A, A, A | A, A, N/D | H0 | 10 |
| A, A, N/D | A, A, N/D | H3 | 10 |
| A, N/D, any | A, A, N/D | H0 | 01 |
| N/D, any, any | A, A, N/D | H3 | 00 |
| A, A, A | A, N/D, any | H2 | 11 |
| A, A, N/D | A, N/D, any | H2 | 01 |

TABLE 14-continued

| HARQ-ACK(1), HARQ-ACK(2), and HARQ-ACK(3) for 1st serving cell | HARQ-ACK(1), HARQ-ACK(2), and HARQ-ACK(3) for 2nd serving cell | Resource | Constellation b(0)b(1) |
|---|---|---|---|
| A, N/D, any | A, N/D, any | H2 | 10 |
| N/D, any, any | A, N/D, any | H2 | 00 |
| A, A, A | N/D, any, any | H1 | 10 |
| A, A, N/D | N/D, any, any | H1 | 01 |
| A, N/D, any | N/D, any, any | H0 | 11 |
| N, any, any | N/D, any, any | H0 | 00 |
| D, any, any | N/D, any, any | | No Tx |

If M=4, the ACK/NACK state of Table 11 can be applied to Table 12, which is summarized as follows.

TABLE 15

| HARQ-ACK(1), HARQ-ACK(2), HARQ-ACK(3), and HARQ-ACK(4) for 1st serving cell | HARQ-ACK(1), HARQ-ACK(2), HARQ-ACK(3), and HARQ-ACK(4) for 2nd serving cell | Resource | Constellation b(0)b(1) |
|---|---|---|---|
| A, A, A, N/D | A, A, A, N/D | H1 | 11 |
| A, A, N/D, any | A, A, A, N/D | H1 | 00 |
| A, D, D, D | A, A, A, N/D | H3 | 11 |
| A, A, A, A | A, A, A, N/D | H3 | 11 |
| N/D, any, any, any | A, A, A, N/D | H3 | 01 |
| (A, N/D, any, any), except for (A, D, D, D) | A, A, A, N/D | H3 | 01 |
| A, A, A, N/D | A, A, N/D, any | H0 | 10 |
| A, A, N/D, any | A, A, N/D, any | H3 | 10 |
| A, D, D, D | A, A, N/D, any | H0 | 01 |
| A, A, A, A | A, A, N/D, any | H0 | 01 |
| N/D, any, any, any | A, A, N/D, any | H3 | 00 |
| (A, N/D, any, any), except for (A, D, D, D) | A, A, N/D, any | H3 | 00 |
| A, A, A, N/D | A, D, D, D | H2 | 11 |
| A, A, A, N/D | A, A, A, A | H2 | 11 |
| A, A, N/D, any | A, D, D, D | H2 | 01 |
| A, A, N/D, any | A, A, A, A | H2 | 01 |
| A, D, D, D | A, D, D, D | H2 | 10 |
| A, D, D, D | A, A, A, A | H2 | 10 |
| A, A, A, A | A, D, D, D | H2 | 10 |
| A, A, A, A | A, A, A, A | H2 | 10 |
| N/D, any, any, any | A, D, D, D | H2 | 00 |
| N/D, any, any, any | A, A, A, A | H2 | 00 |
| (A, N/D, any, any), except for (A, D, D, D) | A, D, D, D | H2 | 00 |
| (A, N/D, any, any), except for (A, D, D, D) | A, A, A, A | H2 | 00 |
| A, A, A, N/D | N/D, any, any, any | H1 | 10 |
| A, A, A, N/D | (A, N/D, any, any), except for (A, D, D, D) | H1 | 10 |
| A, A, N/D, any | N/D, any, any, any | H1 | 01 |
| A, A, N/D, any | (A, N/D, any, any), except for (A, D, D, D) | H1 | 01 |
| A, D, D, D | N/D, any, any, any | H0 | 11 |
| A, D, D, D | (A, N/D, any, any), except for (A, D, D, D) | H0 | 11 |
| A, A, A, A | N/D, any, any, any | H0 | 11 |
| A, A, A, A | (A, N/D, any, any), except for (A, D, D, D) | H0 | 11 |
| N, any, any, any | N/D, any, any, any | H0 | 00 |
| N, any, any, any | (A, N/D, any, any), except for (A, D, D, D) | H0 | 00 |
| (A, N/D, any, any), except for (A, D, D, D) | N/D, any, any, any | H0 | 00 |
| (A, N/D, any, any), except for (A, D, D, D) | (A, N/D, any, any), except for (A, D, D, D) | H0 | 00 |
| D, any, any, any | N/D, any, any, any | | No Tx |
| D, any, any, any | (A, N/D, any, any), except for (A, D, D, D) | | No Tx |

Now, a method of transmitting ACK/NACK through a PUSCH will be described according to an embodiment of the present invention.

In the conventional 3GPP LTE, if one UL subframe exists in a PUCCH and a PUSCH, uplink control information (UCI) is transmitted by being multiplexed with a UL transport block of the PUSCH. For example, if there is a PUSCH transmitted simultaneously with ACK/NACK in a specific UL subframe, the UE performs multiplexing by puncturing the UL transport block and thereafter by inserting corresponding ACK/NACK to the punctured portion. The multiplexed transport block is transmitted on the PUSCH. Transmitting of the UL transport block multiplexed with the UCI is called UCI piggyback. UCI which is piggybacked on the UL transport block is called piggyback UCI.

If the ACK/NACK is transmitted through the PUSCH, capacity is less restricted than the PUCCH, and thus all of individual ACK/NACKs (spatial bundling may or may not be performed) can be transmitted for a plurality of UL transport blocks of a plurality of serving cells. However, since ACK/NACK piggyback requires puncturing of the UL transport block, if the number of bits occupied by the ACK/NACK is excessively great, it may cause a data error.

Therefore, when one or more serving cells are present, it is proposed to transmit piggyback ACK/NACK by using an ACK counter or bundling ACK which is the aforementioned ACK/NACK multiplexing method. When using the ACK counter, the piggyback ACK/NACK may have a fixed number of bits by using a modulo operation. The BS can report to the UE about which method will be used between a method of using bundling ACK and a method of individually transmitting ACK/NACK bits and/or which method will be used between the bundling ACK and the ACK counter.

When the ACK/NACK piggyback is performed by using the bundling ACK or the ACK counter, in order to adaptively determine a payload size of the piggyback ACK/NACK, a UL grant for scheduling the PUSCH may include piggyback information regarding the payload of the piggyback ACK/NACK.

In one embodiment, the piggyback information may include a maximum value of the number of scheduled PDSCHs (or the number of subframes) with respect to a plurality of serving cells. In comparison with a DAI included in a DL grant, the maximum value is denoted by a UL-DAI since it is included in a UL grant. The scheduled PDSCH may include only a PDSCH indicated by the PDCCH, or may further include an SPS PDSCH. If the number of scheduled PDSCHs in a primary cell is 4 and the number of scheduled PDSCHs in a secondary cell is 3, a value of the UL-DAI is 4.

In another embodiment, the piggyback information may include bitmap information with respect to a serving cell in which at least one scheduled PDSCH is transmitted. For example, if there are three serving cells, and a scheduled PDSCH exists only in a $1^{st}$ serving cell, then the bitmap information can be expressed by '100'.

Hereinafter, the scheduled PDSCH may include a dynamic PDSCH and a static PDSCH. The dynamic PDSCH is a PDSCH with a corresponding PDCCH. That is, the dynamic PDSCH is a PDSCH indicated by the PDCCH. The static PDSCH is a PDSCH without a corresponding PDCCH. An example of the static PDSCH is an SPS PDSCH.

Now, ACK/NACK transmission using piggyback information will be described according to an embodiment of the present invention.

The piggyback information may include a UL-DAI indicating the number of scheduled PDSCHs. Alternatively, the UL-DAI may indicate the number of subframes having the scheduled PDSCH. When considering up to a TDD configuration with DL:UL=9:1 on the basis of 2-bit UL-DAI, a modulo-4 operation can be applied as follows.

If the number of scheduled PDSCHs is 1 or 5 or 9, UL-DAI=1.

If the number of scheduled PDSCHs is 2 or 6, UL-DAI=2.

If the number of scheduled PDSCHs is 3 or 7, UL-DAI=3.

If the number of scheduled PDSCHs is 0 or 4 or 8, UL-DAI=4.

Figure 10:
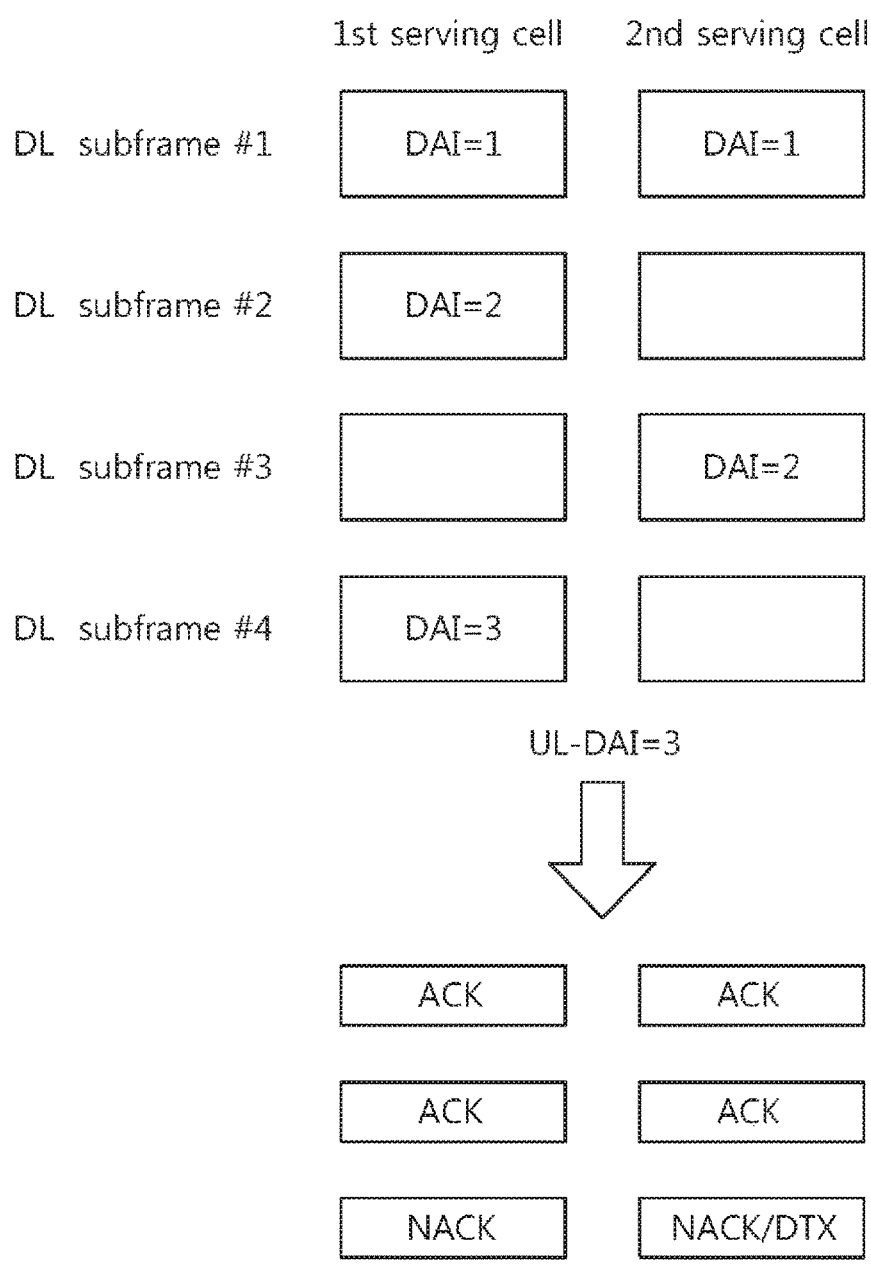
FIG. 10 shows an example of ACK/NACK transmission according to an embodiment of the present invention.

FIG. 10 shows an example of ACK/NACK transmission according to an embodiment of the present invention. It is assumed that M=4, and 4 DL subframes #1, #2, #3, and #4 are associated with a specific UL subframe. The number of DL subframes and arrangement of the subframes are for exemplary purposes only.

In a $1^{st}$ serving cell, a UE detects respective PDCCHs in the DL subframes #1, #2, and #4, and receives respective DL transport blocks through corresponding PDSCHs. Herein, DAI=1, DAI=2, and DAI=3.

In a $2^{nd}$ serving cell, the UE detects respective PDCCHs in the DL subframes #1 and #3, and receives respective DL transport blocks through corresponding PDSCHs. Herein, DAI=1 and DAI=2.

Subsequently, the UE receives a UL grant. The UL grant includes a UL-DAI and a resource allocation for the PUSCH. Herein, UL-DAI=3 since the UL-DAI includes the maximum number of DAIs in the two serving cells (or the maximum number of scheduled PDSCHs).

The UE determines an ACK/NACK state according to the UL-DAI. In this example, UL-DAI=3.

It is assumed that, in the $1^{st}$ serving cell, a response for $1^{st}$ and $2^{nd}$ PDSCHs is ACK and a response for a $3^{rd}$ PDSCH is NACK, and in the $2^{nd}$ serving cell, a response for both of the two PDSCHs is ACK. For a case where there is no corresponding DAI, it can be regarded that the ACK/NACK state is NACK or DTX.

Therefore, an ACK/NACK response for the $1^{st}$ serving cell is (ACK. ACK, NACK), and an ACK/NACK response for the $2^{nd}$ serving cell is (ACK, ACK, NACK/DTX).

According to an original configuration in which resource selection is configured for a plurality of serving cells, since M=4, the ACK/NACK response for the $1^{st}$ serving cell may be (ACK, ACK, NACK/DTX, NACK), and the ACK/NACK response for the $2^{nd}$ serving cell may be (ACK, NACK/DTX, ACK, NACK/DTX). Thus, at least 8 bits are required for whole ACK/NACK transmission.

However, according to the proposed embodiment, a UL-DAI is used to configure the ACK/NACK, and at least 6 bits are required for whole ACK/NACK transmission.

Figure 11:
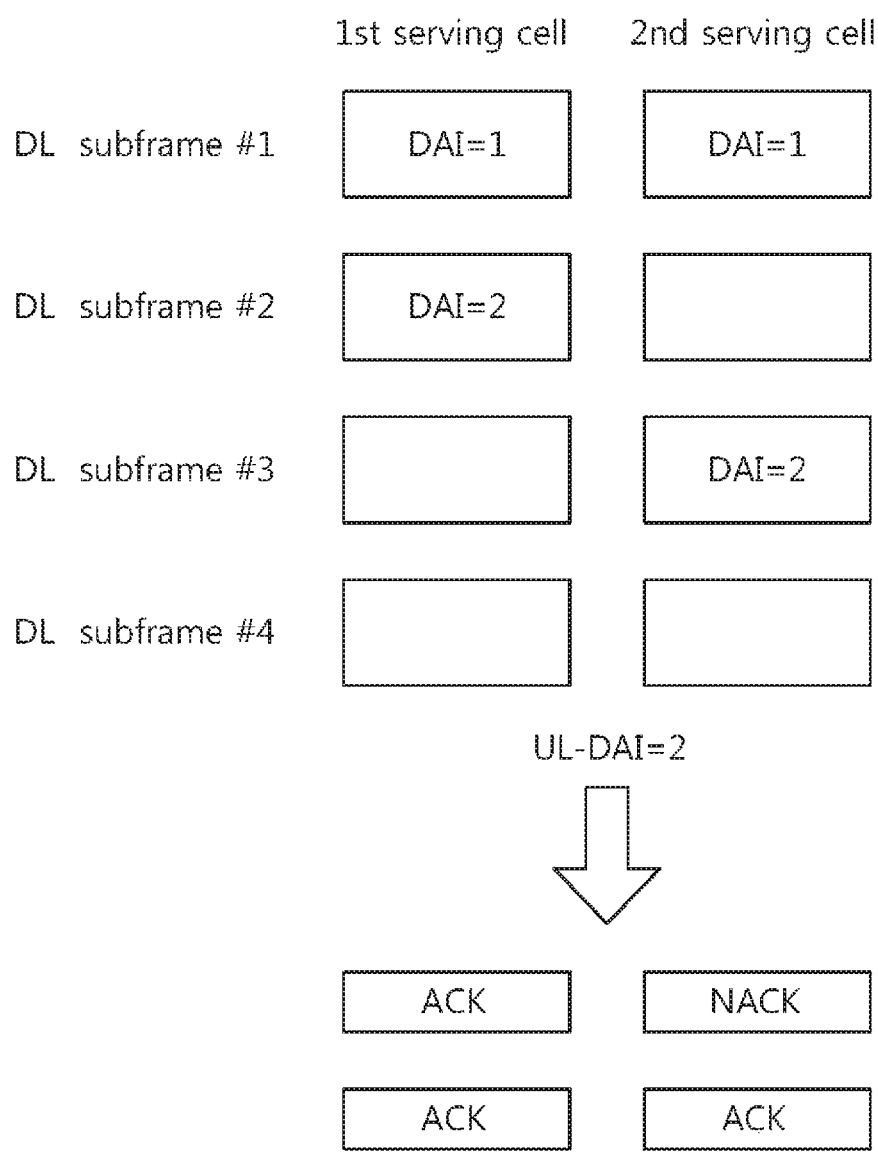
FIG. 11 shows another example of ACK/NACK transmission according to an embodiment of the present invention.

FIG. 11 shows another example of ACK/NACK transmission according to an embodiment of the present invention.

In a $1^{st}$ serving cell, a UE detects respective PDCCHs in DL subframes #1 and #2, and receives respective DL transport blocks through corresponding PDSCHs. It is assumed herein that DAI=1 and DAI=2, and ACK is a response for all cases.

In a $2^{nd}$ serving cell, the UE detects respective PDCCHs in DL subframes #1 and #3, and receives respective DL transport blocks through corresponding PDSCHs. It is assumed that DAI=1 and DAI=2, and NACK is a response for a $1^{st}$ PDSCH and NACK is a response for a $2^{nd}$ PDSCH.

The present invention proposes to replace M to a UL-DAI when ACK/NACK is multiplexed with the PUSCH. Therefore, instead of M=4, ACK/NACK is configured in accordance with the UL-DAI. Accordingly, an ACK/NACK response for the $1^{st}$ serving cell is (ACK, ACK), and an ACK/NACK response for the $2^{nd}$ serving cell is (NACK, ACK).

The static PDSCH can be included in the scheduled PDSCH. For example, in the example of FIG. 11, UL-DAI=3 if an SPS PDSCH exists in the DL subframe #3 of the $1^{st}$ serving cell.

SPS overriding may also occur in case of piggyback ACK/NACK. In this case, in addition to the DAI, a UL-DAI may be additionally used to solve ACK/NACK mismatch.

If the piggyback ACK/NACK is applied, a case in which the UE can recognize the SPS overriding is as follows: a case in which, when an SPS PDSCH is configured with a DL subframe N the UE detects a dynamic PDCCH in the DL subframe N, or a difference between two DAI values received through a DL subframe N−1 and a DL subframe N+1 is 2, a DAI value received through a DL subframe L (N+1≤L≤M) is L, or a last received DAI value is equal to the UL-DAI.

Now, ACK/NACK transmission using an ACK/NACK counter and piggyback information will be described according to an embodiment of the present invention.

Figure 12:
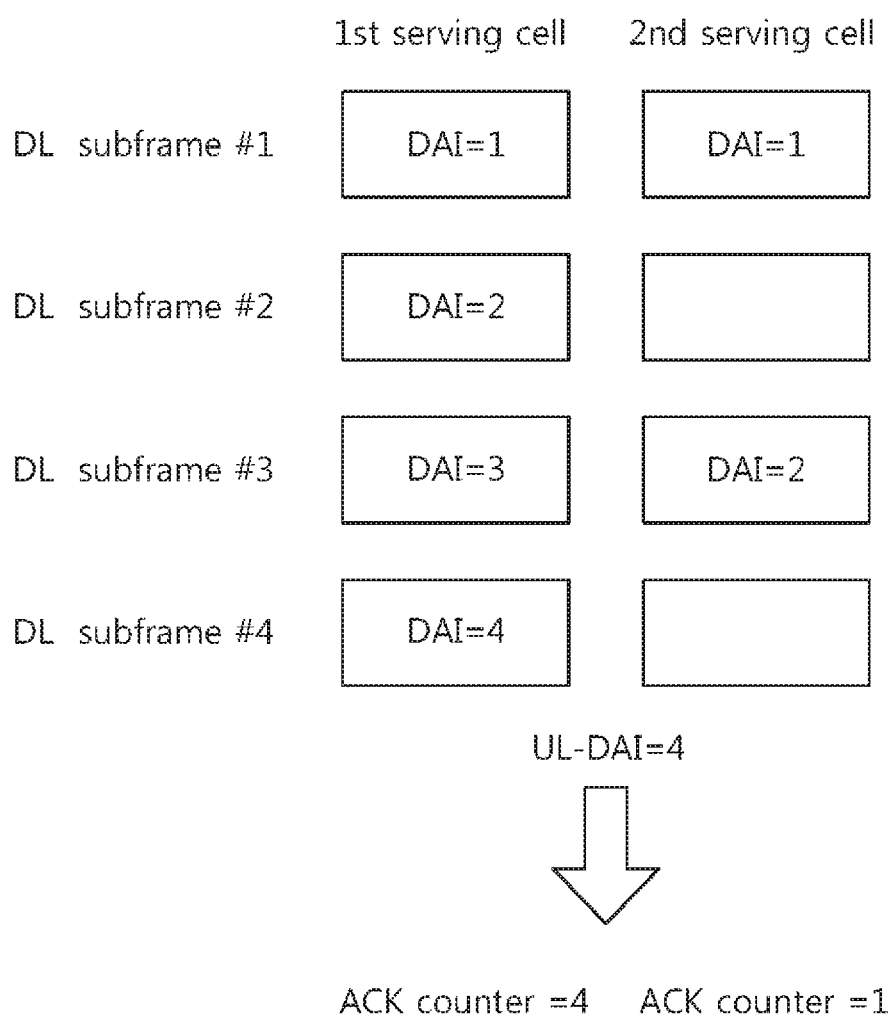
FIG. 12 shows an example of ACK/NACK transmission according to another embodiment of the present invention.

FIG. 12 shows an example of ACK/NACK transmission according to another embodiment of the present invention. It is assumed that M=4, and 4 DL subframes #1, #2, #3, and #4 are associated with a specific UL subframe. The number of DL subframes and arrangement of the subframes are for exemplary purposes only.

In a $1^{st}$ serving cell, a UE detects respective PDCCHs in the DL subframes #1, #2, #3, and #4, and receives respective DL transport blocks through corresponding PDSCHs. Herein, DAI=1, DAI=2, DAI=3, and DAI=4.

In a $2^{nd}$ serving cell, the UE detects respective PDCCHs in the DL subframes #1 and #3, and receives respective DL transport blocks through corresponding PDSCHs. Herein, DAI=1 and DAI=2.

Subsequently, the UE receives a UL grant. The UL grant includes a resource allocation for the PUSCH and the UL-DAI. Herein, UL-DAI=4 since the UL-DAI includes the maximum number of DAIs in the two serving cells (or the maximum number of scheduled PDSCHs).

The UE determines an ACK/NACK counter according to the UL-DAI. It is assumed that, in the $1^{st}$ serving cell, a response for all of the four PDSCHs is ACK, and in the $2^{nd}$ serving cell, a response for a PDSCH with DAI=1 is ACK, and a response for a PDSCH with DAI=2 is NACK. A value of the ACK counter for the $1^{st}$ serving cell is 4, and a value of the ACK counter for the $2^{nd}$ serving cell is 1.

According to the present embodiment, 3 bits are required for each serving cell in order to express one ACK counter. Alternatively, by using 2 bits, a modulo operation can be applied to the value of the ACK counter.

Figure 13:
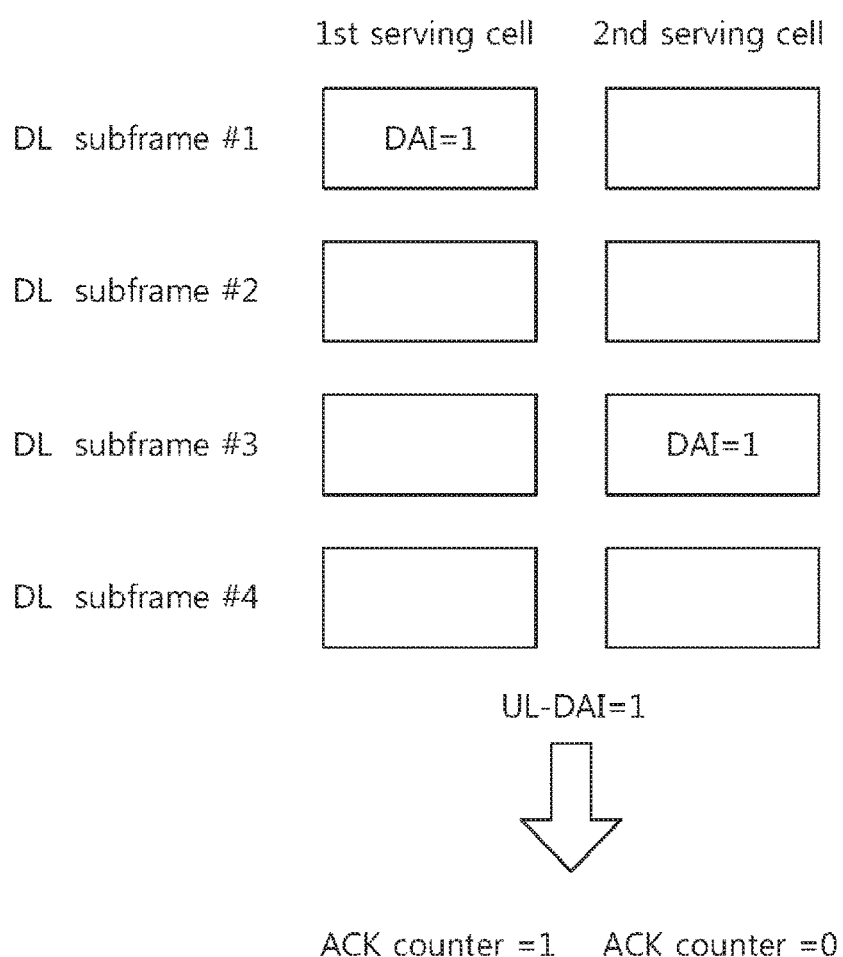
FIG. 13 shows another example of ACK/NACK transmission according to another embodiment of the present invention.

FIG. 13 shows another example of ACK/NACK transmission according to another embodiment of the present invention.

In a $1^{st}$ serving cell, a UE detects a PDCCH with DAI=1 in a DL subframe #1, and receives a DL transport block through a corresponding PDSCH.

In a $2^{nd}$ serving cell, the UE detects a PDCCH with DAI=1 in a DL subframe #2, and receives a DL transport block through a corresponding PDSCH.

Subsequently, the UE receives a UL grant. Herein, UL-DAI=1.

The UE determines an ACK/NACK counter according to the UL-DAI. It is assumed that, in the $1^{st}$ serving cell, a response for a PDSCH with DAI=1 is ACK, and in the $2^{nd}$ serving cell, a response for a PDSCH with DAI=1 is NACK. A value of the ACK/NACK counter for the $1^{st}$ serving cell is 1, and a value of the ACK/NACK counter for the $2^{nd}$ serving cell is 0.

A static PDSCH may be included in a scheduling PDSCH. For example, in the example of FIG. 13, UL-DAI=2 if an SPS PDSCH exists in a DL subframe #3 of the $1^{st}$ serving cell.

According to the value of the UL-DAI, different ACK/NACK multiplexing can be used. For example, if UL-DAI<=2, individual ACK/NACK bits can be used as shown in the embodiments of FIG. 10 and FIG. 11. If UL-DAI>2, the same ACK counter as shown in the embodiments of FIG. 12 and FIG. 13 can be used.

Now, it is described a method of configuring piggyback ACK/NACK by applying ACK/NACK mapping of the aforementioned Tables 8 to 11 and Tables 14 to 15.

Referring to the embodiment of FIG. 10, according to an original configuration in which resource selection is configured for a plurality of serving cells, since M=4, an ACK/NACK state is determined according to Table 15. In HARQ-ACK(j), j corresponds to a DAI. HARQ-ACK(j) without the corresponding DAI can be regarded as NACK or DTX. This implies that an ACK/NACK response is configured by assuming {HARQ-ACK(1), HARQ-ACK(2), HARQ-ACK(3), HARQ-ACK(4)}={A, A, N/D, any} for the $1^{st}$ serving cell and {HARQ-ACK(1), HARQ-ACK(2), HARQ-ACK(3), HARQ-ACK(4)}={A, A, N/D, any} for the $2^{nd}$ serving cell.

However, according to the embodiment of the present invention, it is proposed to replace M to a UL-DAI when ACK/NACK is multiplexed with a PUSCH. Therefore, the ACK/NACK state is determined according to Table 14 in which M=3, rather than M=4. This implies that the ACK/NACK response is configured by assuming {HARQ-ACK(1), HARQ-ACK(2), HARQ-ACK(3)}={A, A, N/D} for the $1^{st}$ serving cell and {HARQ-ACK(1), HARQ-ACK(2), HARQ-ACK(3)}={A, A, N/D} for the $2^{nd}$ serving cell.

According to UL-DAI=3, the ACK/NACK response is configured according to the ACK/NACK state of Table 14. For example, the ACK/NACK response can be configured in such a manner that b(0)b(1)='10' corresponding to the ACK/NACK state is acquired and b(0)b(1) is replaced with a punctured bit of a UL transport block. Alternatively, the ACK/NACK response can be configured in such a manner that a plurality of bits corresponding to the ACK/NACK state are acquired and the acquired bits are replaced with a punctured bit of a UL transport block.

Referring to the embodiment of FIG. 11, according to an original configuration in which resource selection is configured for a plurality of serving cells, since M=4, an ACK/NACK state is determined according to Table 15. This implies that an ACK/NACK response is configured by assuming {HARQ-ACK(1), HARQ-ACK(2), HARQ-ACK(3), HARQ-ACK(4)}={A, A, N/D, any} for the $1^{st}$ serving cell and {HARQ-ACK(1), HARQ-ACK(2), HARQ-ACK(3), HARQ-ACK(4)}={N, any, any, any} for the $2^{nd}$ serving cell.

According to the embodiment of the present invention, it is proposed to replace M to a UL-DAI when ACK/NACK is multiplexed with a PUSCH. Therefore, the ACK/NACK state is determined according to Table 8 or 9 in which M=2, rather than M=4. This implies that the ACK/NACK response is configured by assuming {HARQ-ACK(1), HARQ-ACK(2)}={A, A} for the $1^{st}$ serving cell and {HARQ-ACK(1), HARQ-ACK(2)}={N, A} for the $2^{nd}$ serving cell.

In order to prevent mismatch for a location of the ACK/NACK state in the presence of the SPS PDSCH, when the piggyback ACK/NACK is transmitted through the PUSCH, the HARQ-ACK(j) (1≤j≤UL-DAI) of Table 8 to Table 11 can be defined as follows, with respect to a corresponding serving cell.

(1) When ACK/NACK is transmitted through a PUSCH in the absence of a specific PDSCH.

If UL-DAI=1, spatial bundling is not applied, and an individual ACK/NACK state for each codeword corresponding to DAI=1 is transmitted as an ACK/NACK response.

If UL-DAI=2, spatial bundling is applied, HARQ-ACK(1) corresponds to PDSCH transmission with DAI=1, and HARQ-ACK(2) corresponds to PDSCH transmission with DAI=2.

If UL-DAI=3, spatial bundling is applied, and HARQ-ACK(j) corresponds to PDSCH transmission in which a DAI included in a PDCCH has a value j.

(2) When ACK/NACK is transmitted through a PUSCH in the presence of a specific PDSCH.

If UL-DAI=1, spatial bundling is not applied, and an individual ACK/NACK state for each codeword is transmitted as an ACK/NACK response. In this case, the static PDSCH corresponds to a $1^{st}$ codeword.

If UL-DAI=2, spatial bundling is applied, HARQ-ACK(1) corresponds to PDSCH transmission with DAI=1, and HARQ-ACK(2) corresponds to the static PDSCH.

If UL-DAI=3 or 4, spatial bundling is applied, HARQ-ACK(1) is ACK/NACK for the static PDSCH, and HARQ-ACK(j), 2≤j≤UL-DAI corresponds to PDSCH transmission in which a DAI included in the PDCCH has a value of j−1.

Table 11 above for the case of UL-DAI=4 is designed to reduce performance deterioration caused by overriding mapping of the ACK/NACK state. Only (A, D, D, D) are mapped to (A, D, D, D) in an overriding fashion, and (A, N/D, any, any) are treated equally to (N/D, any, any, any), that is, treated as if ACK does not exist. In this case, it is considered that a probability that four scheduled PDSCHs correspond to (A, D, D, D), that is, a probability that reception of three PDSCHs sequentially scheduled continuously fails, is significantly low.

However, it can be considered a method in which, when ACK/NACK is piggybacked on the PUSCH, the number of bits of the ACK/NACK response to be transmitted is increased to a certain extent so that (A, N/D, any, any) to be missed are mapped to a meaningful ACK/NACK state (i.e., ACK is present). More specifically, the following 5 ACK/NACK states can be defined for each serving cell.

TABLE 16

| HARQ-ACK(1), HARQ-ACK(2), HARQ-ACK(3), HARQ-ACK(4) | ACK/NACK state |
| --- | --- |
| A, A, A, A | #1 |
| A, A, A, N/D | #2 |
| (A, A, N/D, any) | #3 |
| (A, N/D, any, any) | #4 |
| (N/D, any, any, any) | #5 |

Therefore, if piggyback ACK/NACK for L serving cells is assumed, the number of cases of all ACK/NACK states for all of the L serving cells is $5^L$. For example, if UL-DAI=4 and there are two serving cells, the number of cases of all ACK/NACK states is 25, and the number of bits of acquired piggyback ACK/NACKs is 5 bits in total. Alternatively, an independent piggyback ACK/NACK bit can be configured for each serving cell. In this case, by configuring 3-bit piggyback ACK/NACK for each serving cell, 3L-bit piggyback ACK/NACK can be acquired (therefore, in the above example, the piggyback ACK/NACK is 6 bits in total).

Figure 14:
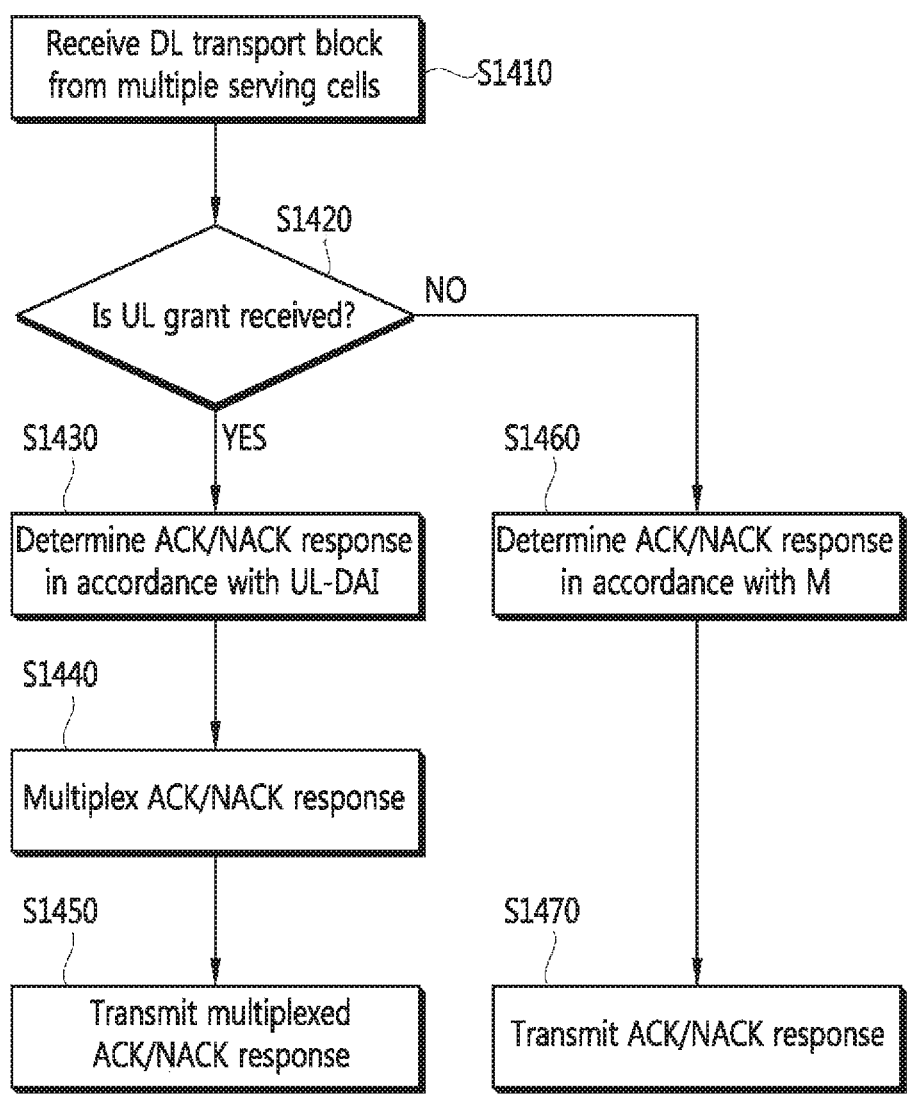
FIG. 14 is a flowchart showing ACK/NACK transmission according to an embodiment of the present invention.

FIG. 14 is a flowchart showing ACK/NACK transmission according to an embodiment of the present invention.

A UE receives a DL transport block from each of a plurality of serving cells (step S1410). It is assumed that M DL subframes are associated with a UL subframe in each serving cell. The UE may receive a dynamic PDSCH by monitoring a PDCCH in each of the M DL subframes, or may receive an SPS PDSCH without the PDCCH.

The UE determines whether a UL grant is received (step S1420). The UL grant includes piggyback information and a UL resource allocation for a PUSCH. The piggyback information includes information regarding a UL-DAI.

Upon receiving the UL-DAI, the UE determines an ACK/NACK response according to the UL-DAI (step S1430). For example, the UE may replace M to the UL-DAI, and thus can determine the ACK/NACK response by applying the ACK/NACK mapping of Tables 8 to 11 and Tables 14 to 15. Even if M=4, if UL-DAI=3, the ACK/NACK response can be determined from the ACK/NACK state of Table 14.

The UE multiplexes the ACK/NACK response to a UL transport block (step S1440). There is no restriction on a multiplexing method, and the same multiplexing performed in the conventional 3GPP LTE can be used.

The UE transmits the multiplexed ACK/NACK response through the PUSCH (step S1450).

If the UL grant is not received, the UE determines the ACK/NACK response according to M (step S1460). If M=4, the ACK/NACK response can be determined from the ACK/NACK state of Table 15.

The UE transmits the ACK/NACK response through the PUCCH (step S1470).

According to the proposed embodiment, a configuration for determining ACK/NACK dynamically on the basis of UL-DAI is modified in a TDD system configured with UL:DL=1:M. Therefore, ACK/NACK mismatch can be decreased between the UE and a BS.

A value of the UL-DAI may not be directly included in the piggyback information. The piggyback information may include state information for indicating one of three states descried below.

State #1: UL-DAI=0
State #2: UL-DAI=1
State #3: UL-DAI>1

When a modulo-4 operation is used, overriding mapping of the UL-DAI, e.g., overriding mapping between UL-DAI=0 and UL-DAI=4, caused by the modulo operation can be avoided. Upon receiving state information indicating the state #1, the UE does not perform UCI piggyback. Upon receiving state information indicating the state #2, the UE can perform UCI piggyback using a 1-bit ACK/NACK counter.

Alternatively, the piggyback information may include state information indicating one of four states described below.

State #1: UL-DAI=0
State #2: UL-DAI=1
State #3: UL-DAI=2
State #4: UL-DAI>2

Upon receiving state information indicating the state #1, the UE does not perform UCI piggyback. Upon receiving state information indicating the state #2, the UE can perform UCI piggyback using a 1-bit ACK/NACK counter. Upon receiving state information indicating the state #3 or the state #4, the UE can perform UCI piggyback using a 2-bit ACK/NACK counter.

Alternatively, a size of piggyback ACK/NACK may be fixed for each serving cell irrespective of the value of the UL-DAI.

Meanwhile, in a TDD configuration with DL:UL=M:1, the UE can perform the ACK/NACK piggyback by not using (or by ignoring) the UL-DAI.

- If M=1, the UE acquires a 1-bit ACK/NACK response for each serving cell.
- If M=2, the UE acquires a 2-bit ACK/NACK response for each serving cell, as shown in Table 8 or 9.
- If M=3, the UE acquires a 2-bit ACK/NACK response for each serving cell, as shown in Table 10.
- If M=4, the UE configures an ACK/NACK response for each serving cell, as shown in Table 16, and acquires a 5-bit ACK/NACK response (if the ACK/NACK is configured for each serving cell, a 6-bit ACK/NACK response) for two serving cells.

If piggyback ACK/NACK is configured based on the UL-DAI, it may be suitable for a case in which DL scheduling is performed relatively evenly across all serving cells. However, if DL scheduling is concentrated only in a specific serving cell, uneven UL-DAI is applied to all serving cells, which may result in the increase in a payload size of the piggyback ACK/NACK.

The UL-DAI may include information indicating a resource used by the piggyback ACK/NACK in the PUSCH. For example, it is assumed that ACK/NACK is fixed to 2 bits for each serving cell, and if M=2, M=3, and M=4, the ACK/NACK mapping of Table 8 or Table 9, Table 10, and Table 11, respectively, are used.

According to the section 5.2.2.6 of 3GPP TS 36.212 V8.7.0 (2009 May), the number Q' of coded symbols for the piggyback ACK/NACK is determined as follows.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$ [Equation 3]

Herein, O denotes the number of ACK/NACK bits, $M_{sc}^{PUSCH}$ denotes a bandwidth for PUSCH transmission in a current subframe, and $N_{symb}^{PUSCH-initial}$ denotes the number of OFDM symbols for each subframe with respect to initial PUSCH transmission for the same transport block. $M_{sc}^{PUSCH-initial}$, C, and $K_r$ are derived from an initial PDCCH for the same transport block.

A resource used for ACK/NACK transmission in the PUSCH can be regulated according to the UL-DAI. More specifically, it is assumed that the UL-DAI includes N bits. Under this assumption, the parameter O of Equation 3 above can be defined by $2^N$ types of values according to the UL-DAI value.

It is assumed that the number of bits of the piggyback ACK/NACK is $O_{ACK}$. If two serving cells are present, and ACK/NACK for each serving cell is fixed to 2 bits, then $O_{ACK}$=4.

The UL-DAI can be defined as W E $\{1, \ldots, 2^N\}$, and the parameter O can be expressed as follows.

$$O = \frac{W}{2^N} O_{ACK} = \frac{W}{2^N} 4$$ [Equation 4]

If a 2-bit UL-DAI is defined as W∈{1, . . . , 4}, the parameter O can be expressed as follows.

$$O = \frac{W}{2^N} O_{ACK} = W$$ [Equation 5]

Equation 3 above shows a case in which one UL transport block is transmitted in one serving cell.

When two UL transport blocks are transmitted in one serving cell, the number Q' of coded symbols for piggyback ACK/NACK is defined as follows.

$$Q' = \max[\min(Q'_{temp}, 4 \cdot M_{sc}^{PUSCH}), Q'_{min}]$$ [Equation 6]

Herein, if O≤2, $Q'_{min}$=O. If O>2, $Q'_{min}$ is defined according to a modulation order of each transport block.

$$Q'_{temp} = \left\lceil \frac{O \cdot M_{sc}^{PUSCH-initial(1)} \cdot N_{symb}^{PUSCH-initial(1)} \cdot}{M_{sc}^{PUSCH-initial(2)} \cdot N_{symb}^{PUSCH-initial(2)} \cdot \beta_{offset}^{PUSCH}} \middle/ \sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)} \right\rceil$$ [Equation 7]

Herein, a superscript (1) denotes a parameter for a $1^{st}$ UL transport block, and a superscript (2) denotes a parameter for a $2^{nd}$ transport block.

If ACK/NACK is piggybacked on the PUSCH, the piggyback ACK/NACK can be configured by applying a maximum possible value (i.e., O=$O_{ACK}$=4) of the UL-DAI. A static PUSCH implies a PUSCH transmitted using a pre-assigned resource without a UL grant.

Now, an embodiment in which piggyback information includes bitmap information for a serving cell for transmitting at least one scheduled PDSCH will be described.

When 2-bit UL-DAI is used, whether to perform scheduling can be indicated for two serving cells. For example, it is assumed that a serving cell with a scheduled PDSCH is indicated by a bit '1', and a serving cell without a scheduled PDSCH is indicated by a bit '0'.

Figure 15:
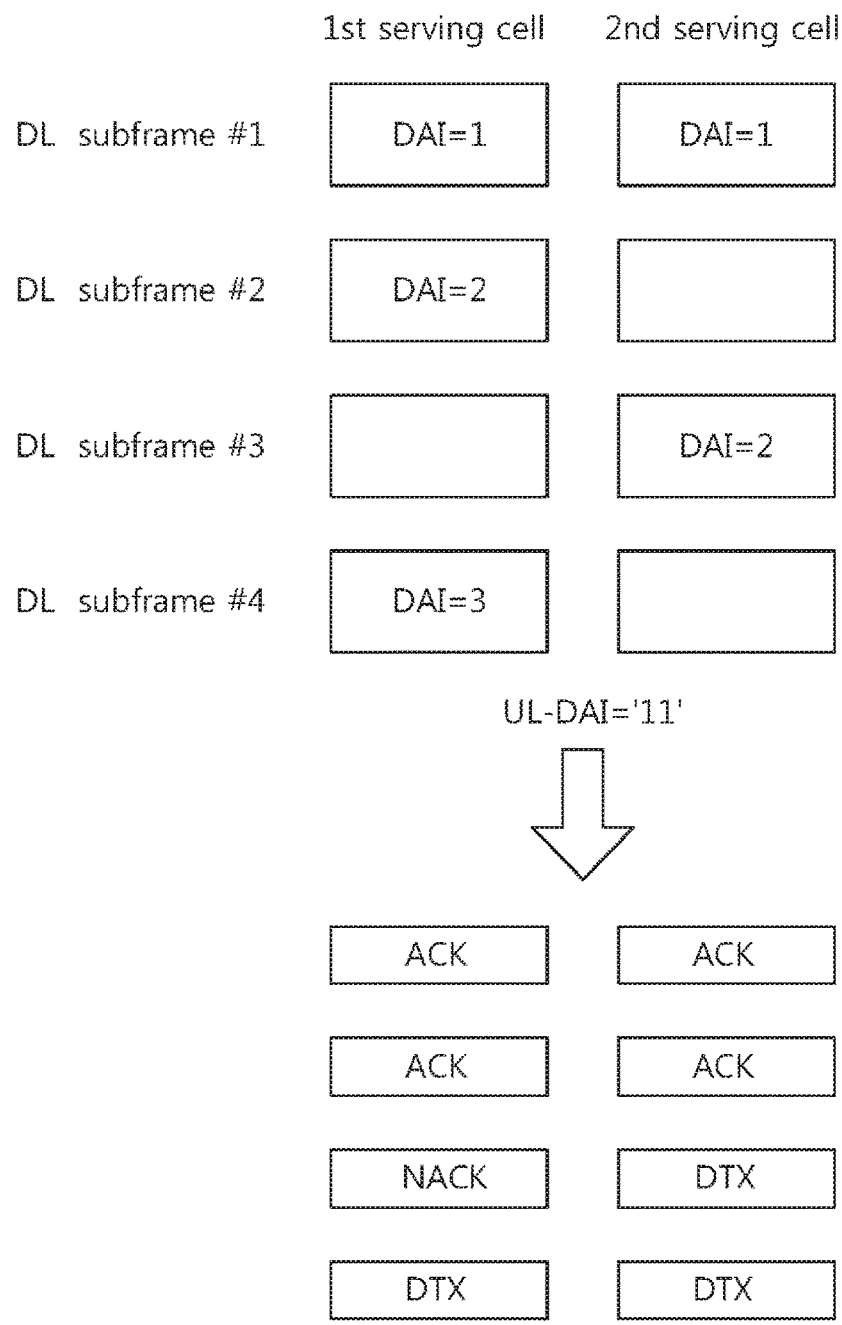
FIG. 15 shows an example of ACK/NACK transmission using bitmap information.

FIG. 15 shows an example of ACK/NACK transmission using bitmap information.

It is assumed that M=4, and 4 DL subframes #1, #2, #3, and #4 are associated with a specific UL subframe. The number of DL subframes and arrangement of the subframes are for exemplary purposes only.

In a $1^{st}$ serving cell, a UE detects respective PDCCHs in the DL subframes #1, #2, and #4, and receives respective DL transport blocks through corresponding PDSCHs. Herein, DAI=1, DAI=2, and DAI=3.

In a $2^{nd}$ serving cell, the UE detects respective PDCCHs in the DL subframes #1 and #3, and receives respective DL transport blocks through corresponding PDSCHs. Herein, DAI=1 and DAI=2.

Subsequently, the UE receives a UL grant. The UL grant includes a UL-DAI and a resource allocation for the PUSCH. The UL-DAI includes bitmap information indicating a scheduled serving cell. Herein, UL-DAI='11'.

It is assumed that, in the $1^{st}$ serving cell, a response for $1^{st}$ and $2^{nd}$ PDSCHs is ACK and a response for a $3^{rd}$ PDSCH is NACK, and in the $2^{nd}$ serving cell, a response for both of the two PDSCHs is ACK. In HARQ-ACK(j), j corresponds to a DAI. HARQ-ACK(j) without the corresponding DAI can be regarded as NACK or DTX.

Accordingly, an ACK/NACK response for the $1^{st}$ serving cell is (ACK, ACK, NACK, DTX), and an ACK/NACK response for the $2^{nd}$ serving cell is (ACK, ACK, DTX, DTX). Therefore, at least 8 bits are required for whole ACK/NACK transmission.

Figure 16:
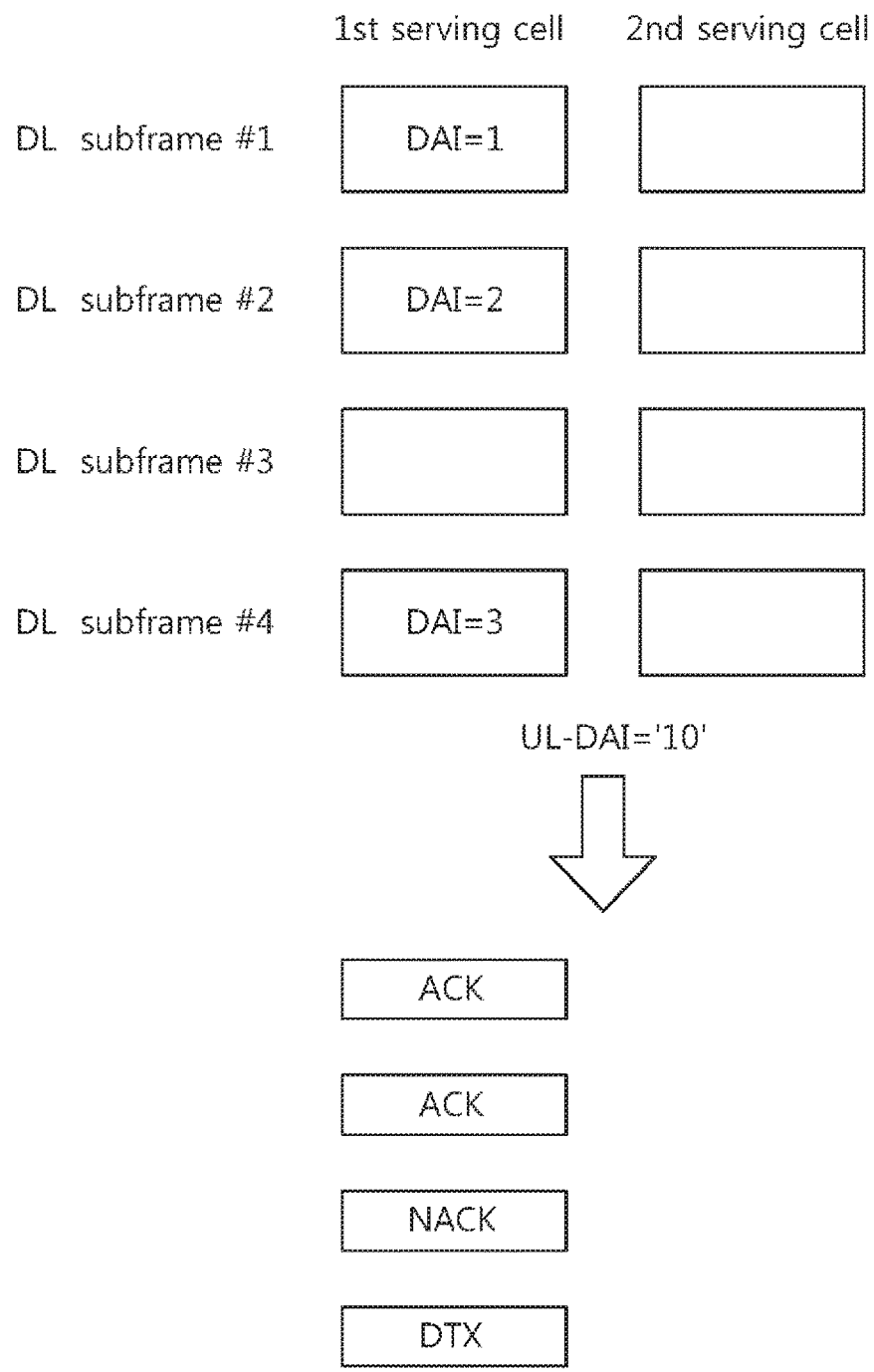
FIG. 16 shows another example of ACK/NACK transmission using bitmap information.

FIG. 16 shows another example of ACK/NACK transmission using bitmap information.

In a $1^{st}$ serving cell, a UE detects respective PDCCHs in the DL subframes #1, #2, and #4, and receives respective DL transport blocks through corresponding PDSCHs. Herein, DAI=1, DAI=2, and DAI=3.

In a $2^{nd}$ serving cell, there is no PDSCH to be scheduled.

A UL-DAI includes bitmap information indicating a scheduled serving cell. Herein, UL-DAI='10'.

It is assumed that, in the $1^{st}$ serving cell, a response for $1^{st}$ and $2^{nd}$ PDSCHs is ACK and a response for a $3^{rd}$ PDSCH is NACK. Therefore, an ACK/NACK response for the $1^{st}$ serving cell is (ACK, ACK, NACK, DTX), and there is no ACK/NACK response for the $2^{nd}$ serving cell. Accordingly, at least 4 bits are required for whole ACK/NACK transmission.

Figure 17:
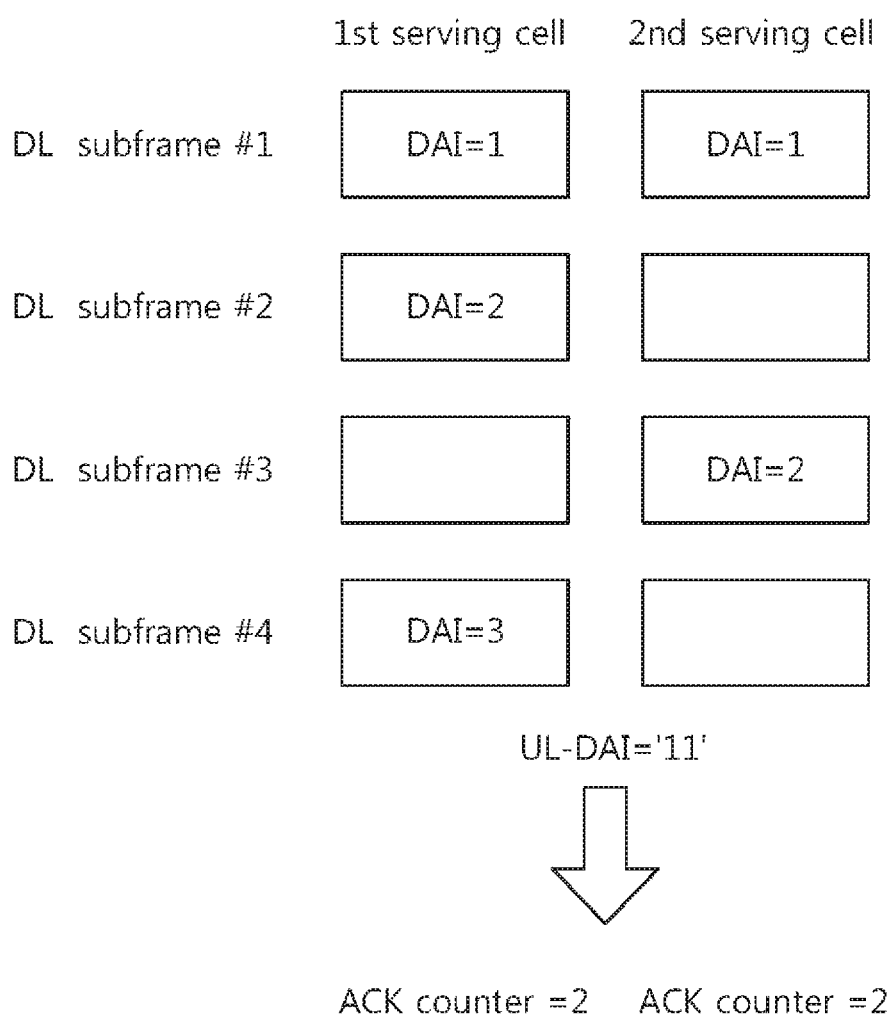
FIG. 17 shows an example of using an ACK counter in the example of FIG. 15.

FIG. 17 shows an example of using an ACK counter in the example of FIG. 15. Herein, UL-DAI='11'. An ACK counter for the $1^{st}$ serving cell is 2, and an ACK counter for the $2^{nd}$ serving cell is 2.

Figure 18:
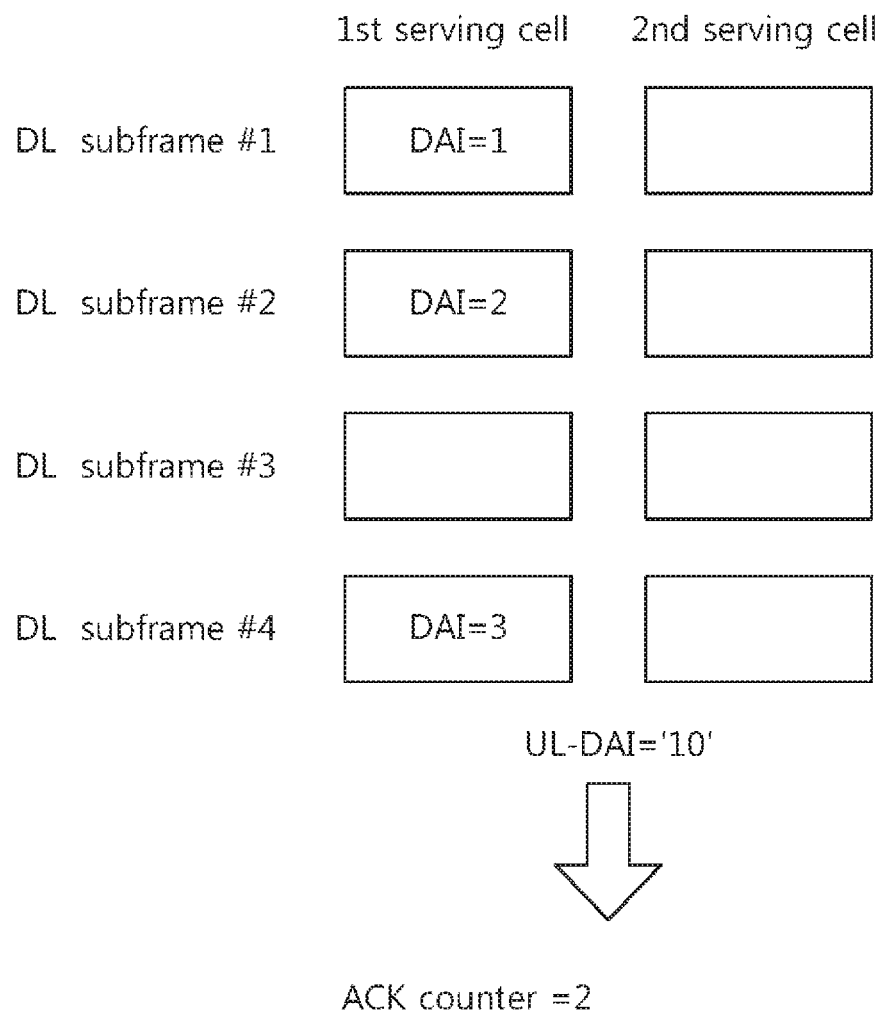
FIG. 18 shows an example of using an ACK counter in the example of FIG. 16.

FIG. 18 shows an example of using an ACK counter in the example of FIG. 16. Herein, UL-DAI='10'. An ACK counter for a $1^{st}$ serving cell is 2. An ACK counter for a $2^{nd}$ serving cell is unnecessary.

If a plurality of serving cells are present, a plurality of PUSCHs can be transmitted. Alternatively, a static PUSCH transmitted without a UL grant (or a PDCCH) may also be present. Among the plurality of PUSCHs, a specific PUSCH to which ACK/NACK will be multiplexed needs to be taken into account.

If the static PUSCH is absent and only a plurality of dynamic PUSCHs are present, the UL-DAI may indicate the number of DL subframes corresponding to one UL subframe, and the UE may configure piggyback ACK/NACK in accordance with the UL-DAI. Alternatively, the UE may configure the piggyback ACK/NACK by determining that a scheduled PDSCH is present in all serving cells.

If the static PUSCH is present and at least one dynamic PUSCH is present, the UE may configure the piggyback ACK/NACK on the basis of piggyback information in a UL grant indicating the dynamic PUSCH.

If the static PUSCH is present, the piggyback ACK/NACK is transmitted through the static PUSCH irrespective of the presence/absence of the dynamic PUSCH. The UL-DAI may indicate the number of DL subframes corresponding to one UL subframe, and the UE may configure the piggyback ACK/NACK in accordance with the UL-DAI. Alternatively, the UE may configure the piggyback ACK/NACK by determining that a scheduled PDSCH is present in all serving cells.

A plurality of UL grants may be required to schedule a plurality of PUSCHs transmitted through a plurality of UL CCs in one UL subframe, and a plurality of UL-DAIS may be transmitted through the plurality of UL grants. In order to prevent the piggyback ACK/NACK from being mismatched between the UE and the BS, the plurality of UL-DAIs are preferably set to the same value.

If the UL-DAIs do not have the same value, corresponding PUSCH transmission may be dropped. All corresponding UL grants may be discarded. If the static PUSCH is present, the UE may configure the piggyback ACK/NACK according to M and/or for all serving cells, and may transmit the piggyback ACK/NACK through the static PUSCH. If the static PUSCH is absent, the UE may transmit an ACK/NACK response through the PUCCH.

Figure 19:
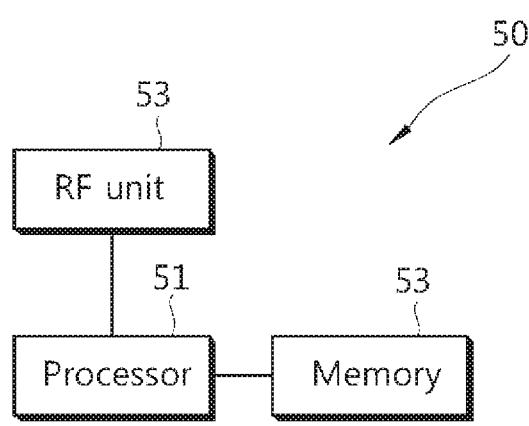
FIG. 19 is a block diagram showing a wireless apparatus for implementing an embodiment of the present invention.

FIG. 19 is a block diagram showing a wireless apparatus for implementing an embodiment of the present invention.

A UE 50 includes a processor 51, a memory 52 and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement the operation of the UE according to the aforementioned embodiments. The processor 51 may configure ACK/NACK, and transmits the ACK/NACK through a PUSCH or a PUCCH.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

What is claimed is:

1. A method of transmitting an acknowledgement/negative-acknowledgement (ACK/NACK) in a wireless communication system based on Time Division Duplex (TDD) in which M downlink subframe(s) are associated with an uplink subframe, where M is equal to or greater than one (1), the method comprising:

receiving, by a user equipment configured with a plurality of serving cells, at least one downlink transport block in the M downlink subframe(s);

determining, by the user equipment, an ACK/NACK response for the at least one downlink transport block by using one of a plurality of pre-defined mapping rules, wherein each of the plurality of pre-defined mapping rules is set to define a mapping relation between M ACK/NACK state(s) for each of the plurality of serving cells and the ACK/NACK response based on M, wherein when an uplink grant comprising a downlink assignment index (DAI) field indicating a pre-determined index value is received by the user equipment, M is replaced by the pre-determined index value for determining the ACK/NACK response for the at least one downlink transport block; and transmitting, by the user equipment, the ACK/NACK response.

2. The method of claim 1, wherein the pre-determined index value is set to a maximum among a number of downlink subframes with at least one downlink transport block for each serving cell.

3. The method of claim 1, wherein the DAI field is 2-bit information.

4. The method of claim 1, wherein each downlink transport block is received on each physical downlink shared channel (PDSCH) and a PDSCH is indicated by a downlink resource assignment in a downlink grant on a corresponding physical downlink control channel (PDCCH), and the DAI field indicates an accumulative number of PDCCH with assigned PDSCH transmission.

5. The method of claim 4, wherein the plurality of serving cells includes a first serving cell and a second serving cell, and wherein if the index value is set to 3, the ACK/NACK response is determined based on a following table:

| HARQ-ACK(1), HARQ-ACK(2), HARQ-ACK(3) for the first serving cell | HARQ-ACK(1), HARQ-ACK(2), HARQ-ACK(3) for the second serving cell |
|---|---|
| A, A, A | A, A, A |
| A, A, N/D | A, A, A |
| A, N/D, any | A, A, A |
| N/D, any, any | A, A, A |
| A, A, A | A, A, N/D |
| A, A, N/D | A, A, N/D |
| A, N/D, any | A, A, N/D |
| N/D, any, any | A, A, N/D |
| A, A, A | A, N/D, any |
| A, A, N/D | A, N/D, any |
| A, N/D, any | A, N/D, any |
| N/D, any, any | A, N/D, any |
| A, A, A | N/D, any, any |
| A, A, N/D | N/D, any, any |
| A, N/D, any | N/D, any, any |
| N, any, any | N/D, any, any |
| D, any, any | N/D, any, any | where 'A' indicates ACK for corresponding downlink transport block, 'N' indicates NACK for corresponding downlink transport block, 'D' indicates no transmission (DTX) in corresponding downlink subframe, 'any' indicates any of ACK, NACK and DTX, and HARQ-ACK(j) is ACK/NACK/DTX for corresponding downlink transport block on PDSCH with a DAI value j in the corresponding PDCCH if there is no PDSCH transmission without corresponding PDCCH.

6. The method of claim 5, wherein if there is a PDSCH transmission without corresponding PDCCH in the first serving cell, HARQ-ACK(1) for the first serving cell is ACK/NACK/DTX for corresponding downlink transport block at the PDSCH without corresponding PDCCH, and HARQ-ACK(j), j=2, 3, for the first serving cell is ACK/NACK/DTX for corresponding downlink transport block on PDSCH with a DAI values j−1 in the corresponding PDCCH.

7. The method of claim 5, wherein if the index value is set to 4, the ACK/NACK response is determined based on a following table:

| HARQ-ACK(1), HARQ-ACK(2), HARQ-ACK(3), HARQ-ACK(4) for the first serving cell | HARQ-ACK(1), HARQ-ACK(2), HARQ-ACK(3), HARQ-ACK(4) for the second serving cell |
|---|---|
| A, A, A, N/D | A, A, A, N/D |
| A, A, N/D, any | A, A, A, N/D |
| A, D, D, D | A, A, A, N/D |
| A, A, A, A | A, A, A, N/D |
| N/D, any, any, any | A, A, A, N/D |
| (A, N/D, any, any), except for (A, D, D, D) | A, A, A, N/D |
| A, A, A, N/D | A, A, N/D, any |
| A, A, N/D, any | A, A, N/D, any |
| A, D, D, D | A, A, N/D, any |
| A, A, A, A | A, A, N/D, any |
| N/D, any, any, any | A, A, N/D, any |
| (A, N/D, any, any), except for (A, D, D, D) | A, A, N/D, any |
| A, A, A, N/D | A, D, D, D |
| A, A, A, N/D | A, A, A, A |
| A, A, N/D, any | A, D, D, D |
| A, A, N/D, any | A, A, A, A |
| A, D, D, D | A, D, D, D |
| A, D, D, D | A, A, A, A |
| A, A, A, A | A, D, D, D |
| A, A, A, A | A, A, A, A |
| N/D, any, any, any | A, D, D, D |
| N/D, any, any, any | A, A, A, A |
| (A, N/D, any, any), except for (A, D, D, D) | A, D, D, D |
| (A, N/D, any, any), except for (A, D, D, D) | A, A, A, A |
| A, A, A, N/D | N/D, any, any, any |
| A, A, A, N/D | (A, N/D, any, any), except for (A, D, D, D) |
| A, A, N/D, any | N/D, any, any, any |
| A, A, N/D, any | (A, N/D, any, any), except for (A, D, D, D) |
| A, D, D, D | N/D, any, any, any |
| A, D, D, D | (A, N/D, any, any), except for (A, D, D, D) |
| A, A, A, A | N/D, any, any, any |
| A, A, A, A | (A, N/D, any, any), except for (A, D, D, D) |
| N, any, any, any | N/D, any, any, any |
| N, any, any, any | (A, N/D, any, any), except for (A, D, D, D) |
| (A, N/D, any, any), except for (A, D, D, D) | N/D, any, any, any |
| (A, N/D, any, any), except for (A, D, D, D) | (A, N/D, any, any), except for (A, D, D, D) |
| D, any, any, any | N/D, any, any, any |
| D, any, any, any | (A, N/D, any, any), except for (A, D, D, D) | where HARQ-ACK(j) is ACK/NACK/DTX for corresponding downlink transport block on PDSCH with a DAI value j in the corresponding PDCCH if there is no PDSCH transmission without corresponding PDCCH.

8. The method of claim 7, wherein if there is a PDSCH transmission without corresponding PDCCH in the first serving cell, HARQ-ACK(1) for the first serving cell is ACK/NACK/DTX for corresponding downlink transport block at the PDSCH without corresponding PDCCH, and HARQ-ACK(j), j=2, 3, 4, for the first serving cell is ACK/NACK/DTX for corresponding downlink transport block on PDSCH with a DAI values j−1 in the corresponding PDCCH.

9. A wireless device configured for transmitting an acknowledgement/negative-acknowledgement (ACK/NACK) in a wireless communication system based on Time Division Duplex (TDD) in which M downlink subframe(s) are associated with an uplink subframe, where M is equal to or greater than one (1), the wireless device comprising:
   a radio frequency unit configured with a plurality of serving cells and configured to transmit radio signals; and
   a processor operatively coupled with the radio frequency unit and configured to:
      receive at least one downlink transport block in the M downlink subframe(s);
      determine an ACK/NACK response for the at least one downlink transport block by using one of a plurality of pre-defined mapping rules, wherein each of the plurality of pre-defined mapping rules is set to define mapping relation between M ACK/NACK state(s) for each of the plurality of serving cells and the ACK/NACK response based on M, wherein when an uplink grant comprising a downlink assignment index (DAI) field indicating a pre-determined index value is received by the user equipment, M is replaced by the pre-determined index value for determining the ACK/NACK response for the at least one downlink transport block; and
      transmit the ACK/NACK response.

10. The wireless device of claim 9, wherein the pre-determined index value is set to a maximum among a number of downlink subframes with at least one downlink transport block for each serving cell.

11. The wireless device of claim 9, wherein the DAI field is 2-bit information.

12. The wireless device of claim 9, wherein each downlink transport block is received on each physical downlink shared channel (PDSCH) and a PDSCH is indicated by a downlink resource assignment in a downlink grant on a corresponding physical downlink control channel (PDCCH), and the DAI field indicates an accumulative number of PDCCH with assigned PDSCH transmission.

* * * * *